US012809887B2

(12) United States Patent
Agarwal et al.

(10) Patent No.: US 12,809,887 B2
(45) Date of Patent: Nov. 24, 2026

(54) DATA CONSISTENCY TECHNIQUES FOR PostgreSQL-COMPATIBLE SYSTEMS

(71) Applicant: Oracle International Corporation, Redwood Shores, CA (US)

(72) Inventors: Deepak Agarwal, Redmond, WA (US); Venkata Harish Mallipeddi, Bellevue, WA (US); Sudarsan Piduri, Campbell, CA (US); Woonhak Kang, San Jose, CA (US); Sandeep Kumar, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/946,834

(22) Filed: Nov. 13, 2024

(65) Prior Publication Data

US 2026/0133994 A1 May 14, 2026

(51) Int. Cl.
*G06F 16/28* (2019.01)
*G06F 16/23* (2019.01)

(52) U.S. Cl.
CPC ........ *G06F 16/284* (2019.01); *G06F 16/2308* (2019.01); *G06F 16/2379* (2019.01)

(58) Field of Classification Search
CPC . G06F 16/284; G06F 16/2308; G06F 16/2379
See application file for complete search history.

(56) References Cited

U.S. PATENT DOCUMENTS 9,817,587 B1 11/2017 Leshinsky et al.
10,095,764 B2 * 10/2018 Park .................... G06F 16/2343
2004/0128470 A1 * 7/2004 Hetzler ............... G06F 12/0804 711/E12.04
2017/0132091 A1 * 5/2017 Leshinsky ............... G06F 3/067
2017/0199678 A1 * 7/2017 Subramanian ........ G06F 3/0685
2022/0171787 A1 6/2022 Chen et al.
2022/0382742 A1 * 12/2022 Procek .................. G06F 9/4881
2023/0145054 A1 * 5/2023 VanBenschoten ...... G06F 16/27 707/620
2023/0409556 A1 * 12/2023 Shay ..................... G06F 16/284

(Continued)

OTHER PUBLICATIONS

U.S. Appl. No. 18/946,846, Non-Final Office Action, mailed on Jan. 28, 2026, 22 pages.

*Primary Examiner* — Huawen A Peng
(74) *Attorney, Agent, or Firm* — Kilpatrick Townsend & Stockton LLP

(57) ABSTRACT

Techniques discussed herein relate to an object-relational database management system (ODMS) (e.g., a PostgreSQL ODMS) that utilizes a shared block storage volume (SBSV) for storage. The SBSV may utilize a file system that enables a single-writer-multiple reader model in which a primary computing node may read or write to the SBSV and one or more replica computing nodes are restricted from writing to the SBSV. To enable the primary computing node to write data at its own pace, regardless of the status of synchronization at each of the one or more replica computing nodes, the SBSV may include a staging area that maintains data that has not yet been updated at one or more of the replica computing nodes. When the primary computing node no longer maintains the data in local memory, the one or more replica computing nodes may obtain the data from the staging area of the SBSV.

21 Claims, 14 Drawing Sheets

(56) References Cited

U.S. PATENT DOCUMENTS

| | | | | |
|---|---|---|---|---|
| 2024/0061603 | A1* | 2/2024 | Varghese | G06F 3/064 |
| 2024/0311170 | A1* | 9/2024 | Rogers | G06F 9/45558 |
| 2024/0370409 | A1* | 11/2024 | Shivani | G06F 16/178 |
| 2025/0077358 | A1* | 3/2025 | Telagamsetti | G06F 11/1448 |
| 2025/0328240 | A1* | 10/2025 | Zheng | G06F 3/067 |

* cited by examiner

DATA CONSISTENCY TECHNIQUES FOR PostgreSQL-COMPATIBLE SYSTEMS

BACKGROUND

Cloud-based database management systems, particularly PostgreSQL, have become essential for environments requiring high availability and scalability. As an open-source object-relational database, PostgreSQL has been widely adopted due to its flexibility and robustness. However, managing data consistency and synchronization between primary and replica nodes presents significant challenges with respect to maintaining respective copies of the data. In traditional implementations, read replicas are synchronized with the primary node through Write-Ahead Logging (WAL), which replicates changes asynchronously. This introduces a lag in replica nodes, making it difficult to guarantee data consistency during the delay. Existing solutions, such as using external page servers or delaying writes until all replicas are ready, add latency and complexity, making it difficult to maintain both performance and consistency in environments with multiple replicas. As a result, there is a need for a more efficient approach that allows read replicas to remain synchronized without compromising performance.

BRIEF SUMMARY

Techniques are provided for providing a PostgreSQL object-relational database management system that is configured to maintain data for an object-relational database within a shared block storage volume (e.g., a block storage volume that is shared between a primary computing node and one or more replica computing nodes). Various embodiments are described herein, including methods, systems, non-transitory computer-readable storage media storing programs, code, or instructions executable by one or more processors, and the like.

One embodiment is directed to a method for performing write operations by an object-relational database management system (ODMS) (e.g., a PostgreSQL ODMS). The method may comprise executing, by a cluster of computing nodes of a cloud computing environment, the object-relational database management system comprising a primary node and one or more replica nodes. In some embodiments, the cluster of computing nodes share access to a shared block storage volume comprising a staging area and a main area, the staging area and the main area collectively storing data corresponding to an object-relational database. The method may comprise receiving, by the primary node of the cluster of computing nodes, a write operation comprising data to be written to the object-relational database. The method may comprise writing, by the primary node of the cluster, the data to the staging area within the shared block storage volume. The method may comprise maintaining, by the primary node of the cluster, a location of the data within the staging area within an in-memory map stored at the primary node of the cluster. The method may comprise writing, by the primary node of the cluster, metadata corresponding to the write operation within a journal specific to the shared block storage volume. In some embodiments, writing the metadata within the journal causes the metadata to be transmitted to one or more replica nodes.

In some embodiments, the primary node is configured to read from and write to the shared block storage volume, and the one or more replica nodes are configured to read only from the shared block storage volume.

In some embodiments, the method may further comprise 1) receiving, at a read-replica node of the cluster of computing nodes, a read operation requesting second data to be read from the object-relational database, 2) determining, by the read-replica node, whether the second data is stored in the staging area, 3) in response to determining that the second data is stored in the staging area, retrieving the second data from the staging area of the shared block storage volume, and 4) in response to determining that the second data is not stored in the staging area, retrieving the second data from the main area of the shared block storage volume.

In some embodiments, the one or more replica nodes are configured to provide respective log sequence numbers to the shared block storage volume, each respective log sequence number indicating a last log sequence number that has been replayed by a respective replica node. In some embodiments, the shared block storage volume stores a minimum log sequence number selected from the respective log sequence numbers provided by the one or more replica nodes.

In some embodiments, previously-stored data is subsequently evicted from the staging area based at least in part on the minimum log sequence number. In some embodiments, the previously-stored data is evicted based at least in part on determining that the data is associated with one or more corresponding log sequence numbers that are less than the minimum log sequence number. Evicting the data may comprise moving the data from the staging area to the main area of the shared block storage volume.

In some embodiments, the method further comprises 1) receiving, by the primary node, a subsequent write operation comprising third data and an additional log sequence number, the additional log sequence number being less than the minimum log sequence number, and 2) writing, by the primary node, the third data corresponding to the subsequent write operation to the main area of the shared block storage volume.

In some embodiments, the method further comprises registering, by the primary node, as a writer of the cluster with a block storage service, wherein the block storage service is configured to accept a write request from a single primary node and reject write requests from nodes other than the single primary node.

A computing device is disclosed. The computing device may comprise one or more processors and one or more memories that store computer-executable instructions that, when executed by the one or more processors, cause the one or more processors to perform any of the methods disclosed herein. One such method may comprise executing as one of a cluster of computing nodes of a cloud computing environment, an object-relational database management (e.g., a PostgreSQL ODMS) system comprising a primary node and one or more replica nodes. In some embodiments, the cluster of computing nodes share access to a shared block storage volume comprising a staging area and a main area, the staging area and the main area collectively storing data corresponding to an object-relational database. The method may comprise receiving a write operation comprising data to be written to the object-relational database. The method may comprise writing the data to the shared block storage volume. In some embodiments, the data is written to the staging area within the shared block storage volume when a log sequence number associated with the data is greater than a minimum log sequence number associated with the staging area. In some embodiments, the data is written to the main area within the shared block storage volume when the log sequence number associated with the data is less than or equal to the minimum log sequence number associated with the staging area. The method may further comprise maintaining a location of the data within the shared block storage volume within an in-memory map stored at the primary node.

In some embodiments, the method performed by the one or more processors further comprises writing metadata corresponding to the write operation within a journal specific to the shared block storage volume.

In some embodiments, the staging area and the main area are automatically resized by a file system process based at least in part on usage.

In some embodiments, a replica node of the one or more replica nodes is configured to determine that the primary node is unhealthy and, in response, register with a block storage control plane, as a new primary node of the cluster. In some embodiments, the replica node is selected by a management plane component of the object-relational database management system.'

A computer-readable medium is disclosed. The computer-readable medium comprises one or more memories storing computer-executable instructions that, when executed by one or more processors of a cloud computing environment, cause the one or more processors to perform any of the methods disclosed herein. One such method may comprise executing at least a portion of an object-relational database management system (e.g., a PostgreSQL ODMS) comprising a cluster of computing nodes. In some embodiments, the cluster of computing nodes comprises a primary node and one or more replica nodes. The cluster of computing nodes may share access to a shared block storage volume comprising a staging area and a main area and the shared block storage volume may store an object-relational database. The method may comprise receiving a read request for data of the object-relational database that is stored within the shared block storage volume. The method may comprise obtaining the data from the shared block storage volume. In some embodiments, the data is obtained from the staging area or the main area based at least in part on a minimum log sequence number associated with the shared block storage volume. The method may comprise storing the data within local memory. The method may comprise updating the data in the local memory based at least in part on one or more journal entries corresponding to the data. In some embodiments, the one or more journal entries indicate respective modifications to the object-relational database.

In some embodiments, the minimum log sequence number is the earliest log sequence number that has been replayed by the one or more replica nodes.

In some embodiments, the shared block storage volume, the staging area, and the main area are automatically scalable.

In some embodiments, the method further comprises maintaining an identifier of a location of the data within the shared block storage volume.

In some embodiments, the one or more replica nodes are configured to read journal entries provided by the primary node, and reading the journal entries causes the one or more replica nodes to update in-memory data.

In some embodiments, the shared block storage volume utilizes a distributed filesystem that enables multiple nodes to concurrently access the shared block storage volume and supports a single-writer-multiple-reader access model.

In some embodiments, the data is obtained from the staging area when a page identifier associated with the data is associated with a log sequence number that is greater than the minimum log sequence number, and wherein the data is obtained from the main area when the log sequence number that is less than or equal to the minimum log sequence number.

In some embodiments, the object-relational database management system is a PostgreSQL object-relational database management system.

Another computer-implemented method is disclosed. The method may comprise executing, by a cluster of computing nodes, an object-relational database management system (e.g., a PostgreSQL ODMS) comprising a primary node and one or more read-replica nodes. In some embodiments, the cluster of computing nodes share access to a shared block storage volume that stores an object-relational database. The method may comprise receiving, by a replica node of the one or more read-replica nodes, log updates individually indicating a corresponding change to be made to the object-relational database. The method may comprise receiving, by a read-replica node of the one or more read-replica nodes, a read request for data corresponding to the object-relational database. The method may comprise obtaining, by the read-replica node of the one or more read-replica nodes from the shared block storage volume, a previous version of a page of the object-relational database, the previous version of the page being associated with a first log sequence number. The method may comprise storing the previous version of the page in local memory of the read-replica node. The method may comprise generating, by the read-replica node of the one or more read-replica nodes, an updated version of the page of the object-relational database based at least in part on sequentially applying a subset of the log updates to the previous version of the page that is stored in local memory of the read-replica node. In some embodiments, each of the subset of the log updates may be associated with a respective log sequence number that is larger than the first log sequence number. The method may comprise providing, by the read-replica node of the one or more read-replica nodes, the data requested with the read request. In some embodiments, the data is obtained from the updated version of the page that is stored in local memory of the read-replica node.

In some embodiments, the primary node alone is allowed to read from and write to the shared block storage volume.

In some embodiments, the read-replica node maintains an in-memory map of respective data segments of the object-relational database. In some embodiments, the log updates are stored in an in-memory tree structure within the local memory of the read-replica node.

In some embodiments, generating the updated version of the object-relational database is performed by a query process executing at the read-replica node.

In some embodiments, the shared block storage volume is managed by a block storage service of a cloud computing environment. The block storage service may be configured to allow any of the cluster of computing nodes to read from the shared block storage volume. The block storage service may restrict write access to the shared block storage volume to only the primary node.

In some embodiments, the previous version of the page of the object-relational database is obtained in response to the read request.

A computing device is disclosed. The computing device may comprise one or more processors and one or more memories that store computer-executable instructions that, when executed by the one or more processors, cause the one or more processors to perform the operations of a method. The method may comprise executing a cluster of computing nodes of a cloud computing environment, the cluster of computing nodes comprising a primary node and a read-replica node of an object-relational database management system (e.g., a PostgreSQL ODMS). In some embodiments, the cluster of computing nodes share access to a shared block storage volume that stores an object-relational database. The method may comprise receiving, by the read-replica node, log updates individually indicating a corresponding change to be made to the object-relational database. The method may comprise receiving, by the read-replica node, a read request for data corresponding to the object-relational database. The method may comprise generating, in local memory of the read-replica node, a current version of a portion of the object-relational database based on 1) obtaining a previous version of the portion of the object-relational database and 2) applying the corresponding change identified by at least one of the log updates. The method may comprise providing, by the read-replica node, the data requested with the read request, the data being obtained from the current version of the portion of the object-relational database that is stored in local memory of the read-replica node.

In some embodiments, the log updates are received from the primary node.

In some embodiments, the shared block storage volume stores multiple versions of the object-relational database and a write-ahead log that stores one or more log updates corresponding to the object-relational database.

In some embodiments, the object-relational database management system being a PostgreSQL object-relational database management system comprising a plurality of read-replica nodes, each of the plurality of read-replica nodes being restricted from processing write requests.

In some embodiments, each computing node of the cluster of computing nodes individually executes a file system that supports a single-writer-multiple-reader model.

A computer-readable medium is disclosed. The computer-readable medium may comprise one or more memories storing computer-executable instructions that, when executed by one or more processors of a cloud computing environment, cause the one or more processors to perform any of the methods disclosed herein. One such method may comprise executing at a portion of a cluster of computing nodes of the cloud computing environment. The cluster of computing nodes may comprise a primary node and a read-replica node of an object-relational database management system (e.g., a PostgreSQL ODMS). The cluster of computing nodes may share access to a shared block storage volume that stores an object-relational database. The method may further comprise receive, by the read-replica node, log updates individually indicating a corresponding change to be made to the object-relational database. The method may further comprise receiving, by the read-replica node, a read request for data corresponding to the object-relational database. The method may further comprise generating, in local memory of the read-replica node, a current version of a portion of the object-relational database based on obtaining a previous version of the portion of the object-relational databased and 2) applying the corresponding change identified by at least one of the log updates. The method may further comprise providing, by the read-replica node, the data requested with the read request, the data being obtained from the current version of the portion of the object-relational database that is stored in local memory of the replica node.

In some embodiments, the log updates are stored in a tree data structure and applying changes corresponding to the log updates comprises traversing the tree data structure.

In some embodiments, the log updates are received from a journal stream. In some embodiments, the primary node is a publisher of the journal stream, and the read-replica node is a subscriber of the journal stream.

In some embodiments, the method may further comprise transmitting, by the replica node to the primary node, an update request for the log updates. In some embodiments, the update request comprises a current log position corresponding to a last log update applied by the read-replica node to in-memory data.

In some embodiments, the method may further comprise starting a second read-replica node to execute as part of the cluster of computing nodes. In some embodiments, the second read-replica node accesses the shared block storage volume to update local storage.

In some embodiments, the second read-replica node executes operations that cause the second replica node to: 1) receive a second read request for the data corresponding to the object-relational database, 2) generate, in second local memory of the second read-replica node, a new version of the portion of the object-relational database based on obtaining a second previous version of the portion of the object-relational databased and applying one or more corresponding changes identified by at least one of the log updates, and 3) provide, by the second read-replica node, the data requested with the second read request, the data being obtained from the new version of the portion of the object-relational database that is stored in local memory of the second read-replica node.

DETAILED DESCRIPTION

Figure 1:
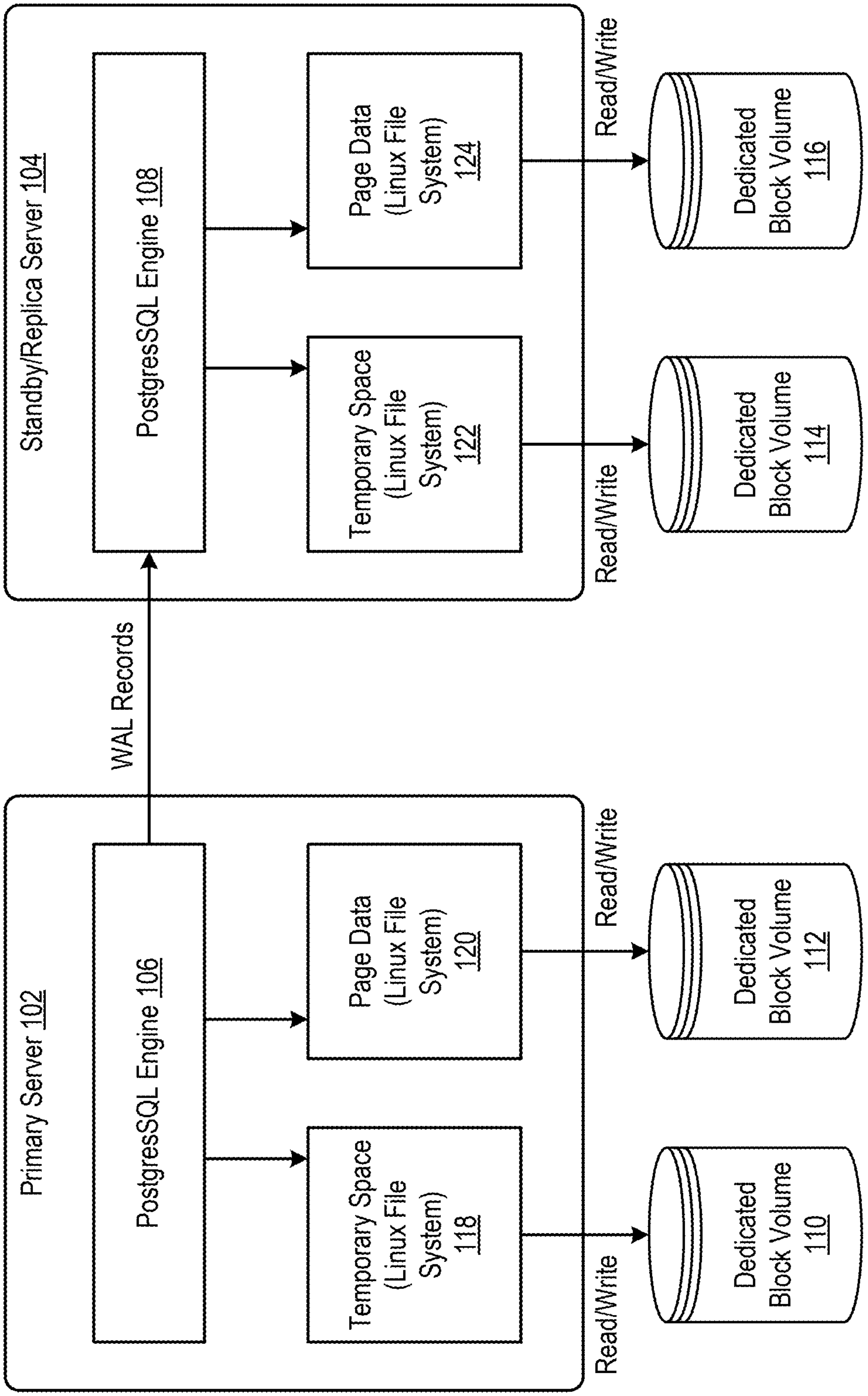
FIG. 1 illustrates a block diagram illustrating a conventional PostgreSQL object-relational database management system (ORDBMS).

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

As database systems continue to scale in cloud environments, ensuring high availability, data consistency, and efficient resource management becomes increasingly challenging. PostgreSQL, a widely-used open-source object-relational database system, is often leveraged in such environments due to its scalability, robust architecture, and extensive feature set. PostgreSQL database engine uses different types of files to store data metadata durably. PostgreSQL incorporates and expands the SQL programming language to offer a variety of features to ensure data is securely stored and efficiently scaled. PostgreSQL supports the ability to write database functions in a variety of languages (e.g., SQL, Perl, Python, JavaScript, and the like) using common database primitives as well as the ability to define complex types.

PostgreSQL conventionally adheres to a client-server architecture model and serves as a service that is configured to manage data structure definitions, data storage, and query processing. Multiple clients may connect either locally or through a network where the client connection is initiated with a master process. The master process of a primary server may receive a client connection and initiated a separate process (e.g., a backend process) that may consume separate processing and memory resources (e.g., CPU and RAM) to perform the requested task(s). PostgreSQL provides options to ensure continuous operations in the event of hardware and/or network issues. In some cases, a standby or replica server may take over the primary server's role in case of failures.

PostgreSQL conventionally utilizes shared memory for inter-process communications (e.g., to exchange individual process information and other data). This shared memory typically includes shared buffers and write-ahead logs (entries of which may be referred to as "WAL records"). PostgreSQL supports two types of replications: physical and logical. Physical or streaming replication may involve replicating the entire database cluster, including the data and the WAL files across nodes. Logical replication may focus on replicating specific data/databases by interpreting and applying the changes recorded in the WAL logs. With this type of replication, PostgreSQL can be designed for High-Availability (HA) and disaster recovery with a desired recovery point objective and recovery time objective. Load balancing in PostgreSQL can be achieved using connection pools that enable the management of many client connections as well as the distribution of read queries among available replicas.

Conventional PostgreSQL includes each read replica maintaining a copy of the data at memory that is accessible and specific to the read-replica. By way of example, each read replica may be configured to maintain a copy of the database data locally, or within cloud storage (e.g., a block volume) that is dedicated to that read replica. In traditional PostgreSQL setups, each replica processes the primary's WAL records asynchronously, which can cause delays in data availability for read queries on replica nodes. This lag means that replica nodes are often behind the primary in terms of data state, increasing the risk that replicas may read outdated or inconsistent data during query execution. Such delays can negatively impact applications that rely on real-time data processing or expect consistent query results across the system.

Existing approaches to address these challenges typically involve delaying writes or using external services like page servers to manage data synchronization between the primary and replicas. Additionally, some conventional PostgreSQL systems work under the assumption that the database files are exclusively owned by the node/instance accessing them and that there are no other PostgreSQL nodes that are simultaneously reading from the same database storage (i.e. shared-nothing storage architecture). These PostgreSQL systems require each read-replica to maintain its database state (both in-memory and on-disk) independent of that of the primary. As the read-replica receives the write ahead log segments from the primary, the read-replica replays these segments, constructs the database pages, and persists them in-memory and/or on disk as needed. These approaches include a high degree of complexity, latency, and resource overhead. The use of external page servers introduces additional network hops, increasing the time needed to process data updates. In some systems, there is a need for the Primary Server to hold onto WAL segments and synchronize background activities until all of the replicas acknowledge receipt of updates. PostgreSQL offers replication slot functionality that provides an automated way to ensure that the primary does not remove WAL segments until they have been received by all replica servers and that the primary does not remove data which could cause a recovery conflict even when the replica is disconnected. Delaying operations until all replicas are synchronized may degrade overall system performance, particularly in dynamic environments where the state of replica nodes varies.

Techniques are disclosed herein for managing data updates in PostgreSQL systems while utilizing shared storage across primary and replica nodes. By utilizing shared storage, only a single copy of the database need be maintained. Utilizing a single copy of the database may provide benefits in that bringing up a new-replica or failover does not need to perform a data copy that conventionally was required in such situations with conventional PostgreSQL. Using the disclosed shared storage solution may reduce the processing power requirements and latency inherent in conventional methods for bringing a new node or failover node up to date with the current database. The disclosed techniques enable the materialization of a page (e.g., the operations needed to bring a page up to date) and synchronization between the primary and replicas to be performed inline, as part of the query processing performed by the read replica itself. These techniques eliminate the need and/or use of page servers to manage data synchronization between the primary and replicas. Additionally, these techniques reduce the number of disk accesses needed to materialize a page by the replicas, which in turn reduce the risk of a read-replica's WAL record processing slowing down the primary. This also establishes the invariant that if a page is in the read-replica's memory, it is the latest version of that page (and can be used to satisfy queries).

The disclosed techniques may utilize a new file system (e.g., Aries PostgreSQL) which may be a PostgreSQL-compatible database engine that leverages shared storage to support faster addition of read-replicas to a running database system, auto-scaled storage avoiding downtime for scaling tasks, and efficient storage management improving storage costs and performance over conventional PostgreSQL solutions. The disclosed file system enables a single-write-multiple-reader solution in which a single, primary node may read and write, while any suitable number of replica nodes (e.g., compute instances) may be utilized to read from the database to service read requests.

The disclosed techniques may include temporarily storing database pages that have been updated by the primary node but have not yet been processed by slower replica nodes within a staging area. This approach allows the primary node to continue handling write operations without waiting for replicas to catch up, ensuring that replica nodes only access database pages that are consistent with their current state, as determined by their respective Log Sequence Numbers (LSNs).

To optimize data access and page reconstruction in the Aries File System (AFS), a fast-path I/O mechanism utilizing a bloom filter in shared memory is proposed. In this approach, the staging area metadata may be stored locally within the AFS process of the primary and/or read-replica nodes, while the bloom filter in shared memory facilitates quick lookups during read operations. When the PostgreSQL process initiates a read request, it can first check the bloom filter to determine if the requested page exists in the staging area. If a match is found, an inter-process communication (IPC) call may be issued to the AFS process to retrieve the page from the staging area. Otherwise, the system may bypass the staging area and proceed with fast-path I/O, directly accessing the block device using cached extent mappings.

For write operations, the PostgreSQL process on a primary node can compare the page's log sequence number (LSN) with the staging truncate LSN stored in shared memory (e.g., a minimum LSN indicating the earliest log that has been replayed by all of the replicas) to determine if the page belongs in the staging area. If it does, the page may be written to the staging area and a log corresponding to the operation may be written to a journal. This staging area-based approach ensures that frequently modified pages are managed efficiently, reducing unnecessary calls while maintaining optimal performance and synchronization across the system.

The disclosed techniques for managing data consistency in PostgreSQL environments offer several key technical advantages over traditional replication methods. First, by introducing a staging area, the system allows the primary node to write updated pages without waiting for all read replicas to catch up. This reduces replication lag and ensures that replicas access only data that is consistent with their own LSNs. As a result, the disclosed techniques avoid the data inconsistencies that can occur in conventional asynchronous replication systems, while allowing the primary node to continue processing write operations efficiently. By temporarily holding updated pages in the staging area, the invention prevents premature overwrites of database pages that replica nodes still need to access, thus reducing the complexity and overhead of synchronizing replica states. This approach eliminates the need for complex external synchronization mechanisms, reducing latency and ensuring faster read and write operations across the database system. Additionally, this efficient use of shared storage lowers resource consumption and improves replica provisioning times.

The staging area architecture improves the scalability of PostgreSQL in distributed cloud environments. As the number of replicas increases, the system ensures that synchronization between the primary node and replicas remains efficient, without sacrificing performance. These techniques may be particularly suitable for large-scale deployments where high availability and consistent data integrity are critical. By decoupling the primary node's write operations from the replica states, the disclosed system and techniques ensure that the system can handle larger workloads while maintaining stability and high performance.

Architecture

FIG. 1 illustrates a block diagram illustrating a conventional PostgreSQL object-relational database management system (ORDBMS) (e.g., system 100). In some embodiments, the System 100 may comprise a Primary Server 102 and one or more standby/read-replica servers (e.g., standby/replica server 104, also referred to herein as "replica nodes"), both of which run instances of a PostgreSQL engine (e.g., PostgreSQL engine 106, PostgreSQL engine 108). Conventionally, the primary server 102 and standby/replica server(s) do not share resources with one another. Rather, the system may be designed to replicate the primary database state across different storage volumes (e.g., dedicated block volumes 110-116) that are accessible to respective servers to ensure data availability and facilitate read scaling in distributed environments.

The Primary Server 102 may be configured to handle both read and write operations for the database, executing queries and managing database updates. The Primary Server 102 may run an instance of PostgreSQL engine 106, which may be configured to facilitate database operations, including managing a Write-Ahead Log (WAL) process. The primary server may temporarily store database changes and/or temporary tables within Temporary Space 118 before writing. Temporary space 118 (e.g., a cache) may be implemented using the Linux File System or another suitable file system and may serve as a buffer area for processing before it the data is written to a dedicated block volume 110. The dedicated block volume 110 may store the primary database. Temporary space 120 may be used as a cache for WAL records or any suitable log files, where ultimately those WAL records/log files are ultimately stored within dedicated block volume 112. Standby/replica server 104 may have similar temporary storage (e.g., temporary space 122 and temporary storage 124) for temporarily storage database tables/updates and log files, respectively, while ultimately storing such data in dedicated block volumes 114 and 116, respectively.

In some embodiments, changes to the database may first be written to the Write-Ahead Log (WAL) before they are applied to the database files, ensuring that all changes are properly logged. WAL records (also referred to as "WAL data") may be transmitted from the primary server to any suitable number of standby/replica servers (e.g., standby/replica server 104). As described herein, any suitable operations and/or functionality described with respect to standby/replica server 104 may similarly be applied to any suitable number of standby/replica servers (also referred to as "replica servers," for brevity). Transmitting WAL records enables the changes to each copy of the database to occur asynchronously, allowing the standby/replica servers to process incoming updates while potentially lagging behind the primary server in terms of data consistency, depending on factors like network speed and processing capacity.

The WAL process on the primary server (e.g., operating as part of the PostgreSQL engine 106) may be utilized to provide WAL records to the replica server(s), ensuring data durability and facilitating replication. In some embodiments, changes to the database may first be written to the WAL before they are applied to the actual database files, ensuring that all changes are properly logged. WAL records may be transmitted from the primary server to the standby/read-replica server 104.

PostgreSQL databases may be used to store the data for an enterprise. As a result of the importance of enterprise data, it may be necessary to make the database highly available and highly durable. In conventional PostgreSQL settings, the database is stored across two disjoint instances (e.g., a copy of the data of dedicated block volume 110 being stored in dedicated block volume 114, a copy of the data of dedicated block volume 112 being stored in dedicated block volume 116, etc.). The primary server and replica servers do not share any resources. If a server (also referred to as a "node," indicating either the primary node/primary server 102 or a replica server) goes down completely, another (e.g., one of the standby/replica servers) can be brought up quickly. In some cases, replica servers are set to standby where they are not utilized to process incoming requests. Some configurations have used the replica server as a read server where the replica server is restricted from making write changes to the database. In this configuration, only the primary server 102 may perform write operations.

There are drawbacks with the configuration provided in FIG. 1. For example, the changes made to the database may be performed asynchronously by the replica servers. The primary server 102 may process write operations and publish write-ahead log (WAL) records to the read-replicas (e.g., standby/read-replica server 104). A process running on each read-replica server may read the incoming WAL records, flush them to disk, and then replay them on local storage to bring cached data up to date. The primary server 102 may be configured to track the status of each replica (e.g., the Log Sequence Number (LSN) up to which each given replica has replayed, where "replaying" refers to the process of fully applying the change indicated in the WAL record). Each read-replica server may process the WAL records at various speeds. Because the primary server 102 tracks the status of each configured read-replica, it can provide some guarantees. For example, the primary may ensure that WAL records are maintained until all of the read-replicas have successfully read and flushed the changes to their local storage. Since the replicas may be service read queries, there could be an active read-only transaction being processed by a read-replica that the primary server 102 may need to account for when deciding whether to purge stale data (e.g., referred to as "vacuuming"). The primary server 102 may be configured to consider all active snapshots on all read-replicas and forgo purging data that is still visible to the snapshots in the read-replicas.

Each read-replica (e.g., standby/read-replica server 104) may process incoming WAL records from the primary server, flush the changes to disk, load data into its cache, and/or replay WAL records to update the data pages that are currently cached in local memory. Incoming read queries provided to a read-replica server may read the latest versions of the data pages from the cache and answer the read queries. Replication lag may be quantified by calculating the difference between the replica's current replay LSN (e.g., the latest log sequence number that the read-replica has processed/applied) and primary's commit LSN (e.g., the latest log sequence number that has been committed/written by the primary server 102). If the cache of a read-replica is full, the replica may decide to evict some pages from the cache and if the pages-to-be-evicted are dirty (e.g., not yet persisted to more permanent storage such as dedicated block volume 114 or standby/read-replica server 104), the read-replica may flush those pages from to its local storage first (e.g., persist that data within its dedicated block volume) before evicting the data from cache. This read-replica behavior requires that the primary server 102 persist the data temporarily in temporary spaces 118 and 120 until every replica server has made the corresponding change in the respective data copy they are configured to maintain. Additionally, each read-replica incurs overhead to maintain the data in dedicated block volume 114.

Maintaining individual copies that correspond to the primary server 102 and each read-replica (e.g., standby/read-replica server 104) is computationally expensive and requires duplicative processing. In view of this, it would be beneficial to maintain a single database that many servers may access. However, conventional PostgreSQL does not support this architecture. The disclosed techniques enable the use of shared-storage across the primary server 102 and each read-replica. To connect each node (e.g., primary server 102 and/or read-replica) a multi-attach feature of a cloud block storage (e.g., OCI Block Volumes) may be utilized to allow multiple nodes to attach to the same volume. Using shared-storage enables such a system to reduce the latency needed to spin-up read-replicas on demand because a copy of the data does not need to be generated as in conventional PostgreSQL. The disclosed techniques additionally allow for storage savings as a single copy of the database is stored.

Figure 2:
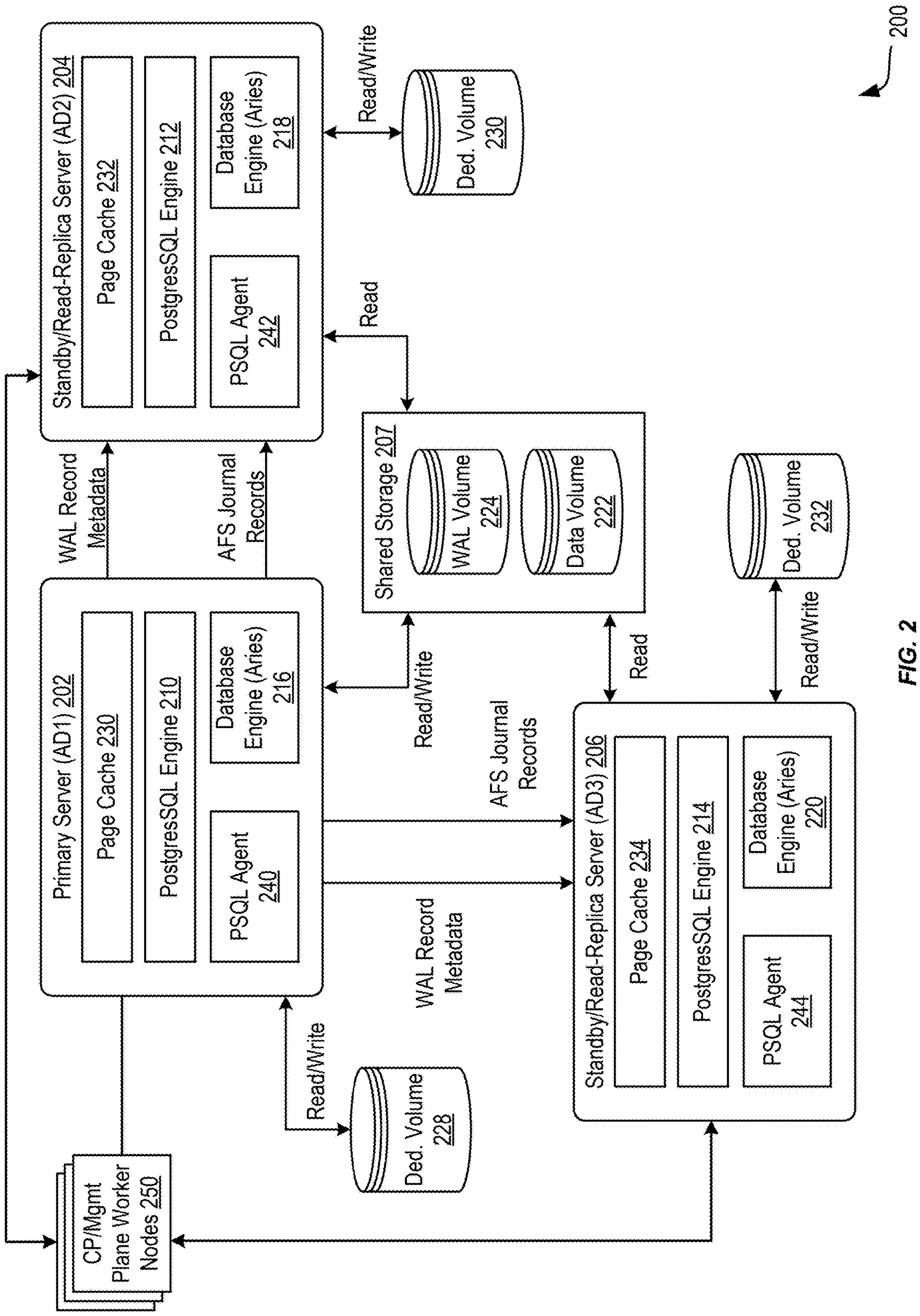
FIG. 2 is a block diagram illustrating an example architecture for a single writer, multiple reader, PostgreSQL-compatible object-relational database management system (ORDBMS), according to at least one embodiment.

As a non-limiting example, FIG. 2 is a block diagram illustrating an example data plane architecture 200 for a single writer, multiple reader, PostgreSQL-compatible object-relational database management system (ORDBMS), according to at least one embodiment. A single write, multiple reader architecture, like the one depicted in FIG. 2, refers to an architecture in which a single node (e.g., a primary node such as primary node (AD1) 202) is the only node that may perform write operations on the database, while any suitable number of read-replicas (e.g., read-replica servers 204 and 206) of the same cluster may be restricted from performing write operations and allowed to perform only read queries. Although not depicted, the primary server 202 may be registered with a block storage service of a cloud-computing environment. As part of the registration, the block storage service may be configured to allow write operations only from the registered node (e.g., primary server (AD1) 202) and no others. In a failover situation in which the primary server (AD1) 202 is no longer processing data (at least for a threshold period of time), a read-replica may take over as primary server. This may include registering the once read-replica as the new primary server with the block storage service such that subsequent write operations may be allowed from the new primary while other read-replicas continue to be restricted by the block storage service from performing write operations on the database.

As depicted in FIG. 2, the System 200 includes a Primary Server (AD1) 202 that is configured to handle read and/or write transactions. The Primary Server (AD1) 202 may configured with a particular availability domain (e.g., availability domain "AD1"). In some embodiments, primary server (AD1) 202 may comprise a PostgreSQL engine (e.g., PostgreSQL engine 210, an example of the PostgreSQL engine 106 of FIG. 1). For durability purposes, one or more replica servers may be utilized in the same or different availability domains. In the example of FIG. 2, primary server (AD1) 202 is provided within availability domain "AD1," standby/read-replica server (AD2) 204 is provided in availability domain "AD2," and standby/read-replica server (AD2) 206 is provided in availability domain "AD3." As depicted, standby/read-replica server (AD2) 204 or standby/read-replica server (AD2) 206 (collective referred to "replica servers") may be candidates to take over write operation handling responsibility should primary server (AD1) 202 become unavailable or otherwise cease processing write operations (e.g., due to hardware failure and/or network issues).

In some embodiments, primary server (AD1) 202 may be configured to manage write operations for shared storage 207. In some embodiments, shared storage 207 may be accessed at any suitable time by any suitable combination of primary server (AD1) 202, standby/read-replica server (AD2) 204, and/or standby/read-replica server (AD2) 206. In some embodiments, the read-replica servers (e.g., standby/read-replica server (AD2) 204 and standby/read-replica server (AD2) 206, as depicted in FIG. 2) may be configured to handle operations for read requests, that is, read requests that are forwarded by the primary server (AD1) 202 to a given read-replica server for processing.

Primary server (AD1) 202 and each of the standby/read-replicas may execute a respective database engine specific to a file system (e.g., database engine (Aries) 216, database engine (Aries) 218, and database engine (Aries) 220, respectively). In some embodiments, a custom filesystem implementation (referred to as "Aries") enables the single writer, multiple reader model with respect to shared storage 207. The Aries custom filesystem may enable the shared storage subsystem for PostgreSQL and may provide differentiated features including, but not limited to:

- Auto-Scale Storage: functionality that enables the system to auto-scale shared storage without any downtime. In conventional PostgreSQL, it is difficult to predict a suitable storage size when provisioning a database. Therefore, database administrators are often forced to over-provision storage to avoid downtime for the database. Auto-scaling storage to match storage needs reduces, if not eliminates, the over-provisioning drawbacks of conventional PostgreSQL.
- Pay-Per-Use Storage: A pay model in which customers only pay for the actual storage they consume as opposed to a provisioned storage model in which they pay for provisioned size irrespective of actual usage.
- Efficient Storage Management: Aries PostgreSQL Architecture eliminates the need for full-page writes and thus provides additional performance benefits over conventional PostgreSQL systems.
- Cost-effective and on-demand Read Scaling: Customers can provision on-demand read-only PostgreSQL servers(read-replicas) without incurring additional cost or overhead associated with traditional PostgreSQL replication-based systems.
- Low TOC (Total Cost Of Ownership): Because a fully-managed service is utilized, customers may realize a lower cost of ownership associated with their database systems as overheads associated with monitoring, tuning, etc. would be alleviated.
- Low Resource Intensive Backups: Backups may be off-loaded to a block storage layer and the backups may be handled in such a way that a database system does not incur any resource cost (e.g., CPU usage, memory usage, access locks, etc.) while asynchronous backups are taken.
- Tuned Default PostgreSQL Configuration: Database systems may be provisioned with a tuned set of PostgreSQL configuration parameters (e.g., based on a hardware configuration and PostgreSQL version) that provide the best database performance for a specific type of workload (e.g., 50% Read and 50% Write) out of the box.
- PSQL Client Console: Customers may connect to their provisioned database system via an on-demand, ephemeral cloud shell via OCI PostgreSQL cloud shell extension.

PSQL agents 240, 242, and 244 may include a management agent that may be deployed on all nodes to enable manageability and operational control. PSQL agents 240-244 may individually act as a communications conduit between an Aries PostgreSQL control plane (not depicted) and a data plane (e.g., the data plane architecture 200). PSQL agents 240-244 may be configured to operate as a management agent providing Aries PostgreSQL life cycle management, configuration management, health monitoring, PostgreSQL role management, or the like.

Each of the database engines 216-220 may be configured to manage access across shared storage 207 according to the custom Aries filesystem. Shared storage 207 may be utilized by these database engines to store database files (e.g., within data volume 222) and any suitable log files (e.g., within WAL volume 224). By way of example, WAL metadata (also referred to as "WAL record(s)") that indicate a sequence of database changes may be stored in WAL volume 224 of the shared storage 207. In some embodiments, each of the servers (the primary server (AD1) 202, read-replica servers 204 and 206, collectively referred to as "nodes") may store any suitable portion of these WAL records within respective dedicated storage such as dedicated volumes 228, 230, and 232, respectively. In some embodiments, a read-replica (e.g., standby/read-replica servers 204 and 206) may read WAL records from a WAL stream (e.g., a stream provided by primary server (AD1) 202) and stored these WAL records in an in-memory tree (e.g., an in-memory b-tree, etc.) indexed by the page that the WAL record targets (e.g., a page for which the change indicated in the WAL record relates). The WAL records may be applied to pages. However, in some embodiments, the WAL records may only be applied ("replayed") for pages that are currently stored in memory. Applying/replaying these WAL records may therefore be performed without accessing disk storage (e.g., shared storage 207). This may reduce the risk of a read-replica's WAL record processing slowing down the primary and establishes the invariant that if a page is in the read-replica's memory, it is the latest version of the page and can be used to satisfy read queries/requests.

Changes to the Aries filesystem (AFS) (e.g., creating a file, allocating an extent to a file, etc.) may be maintained in journal records and distributed from the primary server (AD1) 202 to the standby/read-replica servers 204 and 206 of ADs 2 and 3, respectively. The replica nodes may replay the AFS journal entries to keep their in-memory metadata up to date and to obtain visibility into the changes that happened on the primary node. AFS journal records may be provided by the primary server (AD1) 202 to the standby/read-replica servers 204 and 206 of ADs 2 and 3, respectively, and stored in a similar manner as WAL records (e.g., within shared storage 207 and/or within dedicated volumes such as dedicated volumes 230-234). WAL records may indicate changes to the database, while AFS journal records may indicate changes to the filesystem. In some embodiments, dedicated volumes 228-232 may each be an instance of local storage or any suitable storage that is accessible to the corresponding node or dedicate volumes 228-232 may be cloud based storage (e.g., block storage) that is accessible to a single respective node as depicted in FIG. 2. For example, dedicated volume 230 may be a block storage volume within a cloud computing environment where dedicated volume 230 may be accessible to only standby/read-replica server (AD2) 204.

Each of the nodes of the cluster (e.g., primary server (AD1) 202, read-replica servers 204 and 206, etc.) may include a respective page cache (e.g., page caches 230, 232, and 234). For example, Primary Server (AD1) 202 may also include page cache 230. Each of the page caches 230-234 may be used for optimizing performance purchases by storing frequently accessed data in local memory (e.g., RAM) of a given node.

While processing a read request/query, the read replica (e.g., standby/read-replica servers 204 and 206) may in some cases need to obtain the page from shared storage 207. Once stored in memory, the read replica may determine that the page is stale and needs updating/materialization. The read replica may consult the above mentioned in-memory tree data structure to retrieve all the WAL records corresponding to the page and may apply the changes corresponding to the retrieved WAL records in sequence. Therefore, in some embodiments, the materialization of the page is performed by the query process that processes the read request/query. Other processes (e.g., the ongoing WAL replay process) may be unaffected. For ongoing updates (e.g., received from the stream provided by the primary server (AD1) 202), WAL records may be applied for only pages that are stored in memory (e.g., at page cache 232, page cache 234, etc.). This ensures that the only disk access needed to materialize a page is to read the page itself. In addition, by using the query process for materialization, the disclosed techniques eliminate the need for a separate, 'page-materialization' server that may become a bottleneck in conventional systems.

The CP/Mgmt Plane Worker Nodes 250 (e.g., "worker nodes 250," for brevity) may handle operations such as scaling, provisioning new read-replica servers, monitoring system performance, and managing backups. The worker nodes 250 may manage distribution of updates, ensuring that all servers in the system are running consistent software versions and configurations. In some embodiments, the data plane architecture 200 may operate according to the cloud computing architecture 900 of FIG. 9 and may be configured by control plane and/or management plane components (e.g., one or more components of the Control Plane VCN 916 of FIG. 9) to handle backups and recovery, monitoring, and security and compliance. With respect to backups and recovery, customers may be able to create on-demand or schedule-based snapshots of their database system with configurable retention time. Utilizing control plane components and/or control plane hosted user interfaces, customers may create a new Aries PostgreSQL DB System from a backup and an existing DB System can be restored from a backup as well. Customers may utilize monitoring functionality provided by the CP/Management plane to monitor the runtime characteristics (at a node level and PostgreSQL level) of their database system and use the data to fine-tune database performance. In some embodiments, PostgreSQL logs may be available to the customers via control plane hosted user interfaces to aid in debugging tasks and performance tuning aspects. Aries PostgreSQL maintains the data encrypted at rest and in transit. The underlying nodes may be patched/updated periodically, as per the customer's chosen maintenance schedule, to address software bugs and security vulnerabilities.

Figure 3:
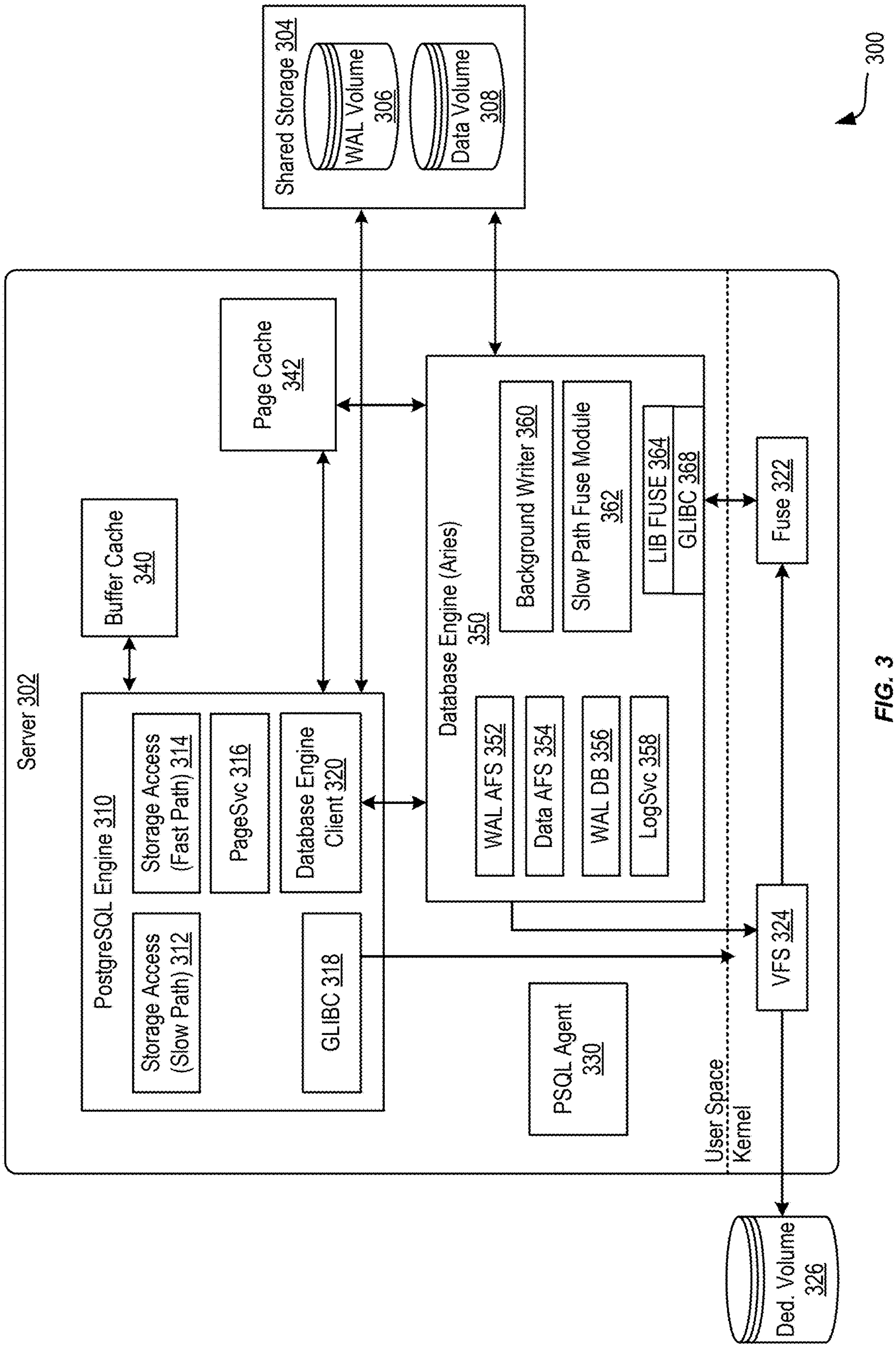
FIG. 3 illustrates an example computer architecture for a server of the PostgreSQL-compatible ORDBMS of FIG. 2, according to at least one embodiment.

FIG. 3 illustrates an example computer architecture 300 for a server of the PostgreSQL-compatible ORDBMS of FIG. 2, according to at least one embodiment. By way of example, server 302 may be an example of primary server (AD1) 202 of FIG. 2, standby/read-replica server (AD2) 204, or standby/read-replica server (AD3) 206). Server 302 may be configured to access shared storage 304 (e.g., an example of the shared storage 207 of FIG. 2) including WAL volume 306 and/or data volume 308, each an example of the WAL volume 224 and data volume 222 of FIG. 2, respectively.

In some embodiments, the server 302 may execute PostgreSQL engine 310, an example of the PostgreSQL engine 210-214 of FIG. 2. PostgreSQL engine 310 may comprise any suitable number of subcomponents responsible for managing both fast and slow paths of data access. Pipelines corresponding to Storage Access (Slow Path) 312 and Storage Access (Fast Path) 314 may provide different methods for accessing storage based on the performance sensitivity of the operations. The pipeline corresponding to the storage access (fast path) 314 may be configured to bypass kernel layers to minimize latency for time-critical database operations, while the pipeline corresponding to the storage access (slow path) 312 may be used for conventional storage access. GLIBC 318 may facilitate system calls and interaction between the PostgreSQL engine 310 and the kernel layer (e.g., VFS 324). FUSE 322 may correspond to a Linux mount point for the Aries process (e.g., database engine (Aries) 350). The slow path pipeline may cause PostgreSQL logs (e.g., WAL records) to be stored with dedicated volume 326) by a virtual file system (VFS 324). Dedicated volume 326 may be an example of the dedicated volumes 228-232 of FIG. 2.

PostgreSQL engine 310 may be modified to include pageSvc 316. Conventional PostgreSQL may include an intermediary service (e.g., "Page Server", not depicted) separate from the PostgreSQL engine 310, where the page server implements at least some of the functionality discussed in connection pageSvc 316. This functionality may, in some embodiments, be encapsulated within pageSvc 316 and executed at each node (e.g., server 302). In embodiments in which server 302 is a read-replica server, the pageSvc 316 subcomponent may be used to reconstruct data pages based on WAL records (e.g., records received from a primary server such as primary server (AD1) 202 of FIG. 2), ensuring that server 302 can access the correct version of the page by referencing its current replay Log Sequence Number (LSN) and the LSNs corresponding to the WAL records received from the primary server. PageSvc 316 may include logic that is embedded in the PostgreSQL engine 310 that enables pages of the Aries filesystem to be reconstructed on the fly. Executing the operations corresponding to pageSvc 316 may cause the server 302 to read a potentially old version of the page (e.g., where pageLSN (the LSN of the page)<replica.replayLSN (the last LSN replayed at the server 302)) from shared storage 304, and then replay any WAL records applicable to this page since the last checkpoint (the last LSN replayed) to bring the page up to date. In order to make this replay efficient, the WAL records may be indexed or otherwise associated with a page number such that only WAL records corresponding to the page may be read and replayed.

The PostgreSQL engine 310 may interact with buffer cache 340 and page cache 342, which may be used to optimize database performance by storing frequently accessed data in memory. Buffer cache 340 may store recently accessed data pages to reduce the need for disk reads, while the page cache 342 may act as a dedicated in-memory cache specifically for Aries PostgreSQL data. PostgreSQL relies heavily on caching in order to alleviate problems associated with storage input/output performance. PostgreSQL is configured to maintain a cache for data pages called a "buffer cache," and it also relies on an operating system (OS) page cache where file pages are cached by the OS. Unlike OS page cache, which is generic and shared by all running applications, page cache 342 may be dedicated to caching PostgreSQL data. In some embodiments, page cache 342 may be persisted even if PostgreSQL were to restart (crashes, explicit stop/start/restart, etc.). Page cache 342 may include a continuous memory space divided into pages. Each page may be sized according to a PostgreSQL page size (e.g., a default of which may be 8 kilobytes (KB)). Page cache 342 may be configured to utilize procedure calls to implement input/output operations against shared storage 304. In some embodiments, each of the components of PostgreSQL engine 310 may access page cache 342 at any suitable time. In some embodiments, loading and changing PostgreSQL pages happen via page cache 342. The page cache 342 may utilize a least recently used (LRU) scheme for page eviction or another suitable eviction scheme. A page that is selected for eviction may be referred to as "a victim page." On a primary server, if the content of the victim page is dirty (not persisted in shared storage 304), the page may be first flushed to disk before being used, while on a read-replica server, the page may be discarded.

PostgreSQL engine 310 may include database engine client 320 which may be a client of the database engine (Aries) 350 and may enable data to be exchanged by the components of PostgreSQL engine 310 and database engine (Aries) 350. Database engine (Aries) 350 is intended to be an example of the database engines 216-220 of FIG. 2. Database engine (Aries) 350 may enable any of the components of PostgreSQL engine 310 to call, or otherwise invoke, the functionality provided by the database engine (Aries) 350. Database engine (Aries) 350 is configured as a database engine for an Aries File System (AFS). AFS may be implemented as a shared library that links into the Database engine (Aries) 350 (i.e. there is no separate node/service running this file system). Database engine (Aries) 350 may journal all file system metadata operations into a write ahead log on a block volume. The primary server and read-replicas mount this block volume for reading. Read-replica servers may also subscribe for these log entries (over the network) from the primary. Read-replicas may synchronize their in-memory state using this write ahead log.

PostgreSQL engine 310 may be configured to initiate a process that executes database engine (Aries) 350 (e.g., at startup, or any suitable time). In some embodiments. the database engine (Aries) 350 may include components such as WAL AFS 352, Data AFS 354, WAL DB 356, and LogSvc 358. These components may be responsible for reading and writing data and for ensuring consistency across the system. Background Writer 360 may be used to periodically flush dirty pages (pages have not been persisted in shared storage 304) from the page cache 342 to shared storage 304. The dirty pages in the page cache 342 may be periodically flushed to shared storage 304 by the background writer 360, which, in some embodiments, may be a perpetually running thread in the Aries process (e.g., a process executing the database engine (Aries) 350). Background writer 360 may be configured to attempt a steady write queue depth to the disk, while also reducing the possibility of dirty victim pages-so that user queries would not need to write the dirty pages to the disk themselves.

Conventional PostgreSQL is configured to ensure that a single page is never read or written by multiple processes via its page-level locking scheme. However, in the page cache 342 of the Aries PostgreSQL solution described herein, a page could be selected as a victim page while it is being read or written another process, and/or a page may be modified while the background writer 360 is flushing the page to disk. In some embodiments, if a page is being read from or written into by one thread, another thread trying to access the page may be added to a waitlist, and upon completion of the update the waiting thread may be notified to resume.

When an Aries Filesystem (AFS) log record (also called Mini Transaction Record (MTR)) is written, LogSvc 358 may be configured to guarantee that either the entire log record is written or none of it is written, or in other words. The LogSvc 358 may be configured to package all changes that need to be performed atomically into a single MTR. As an example, when a file is extended, the file extent may need to be allocated and the file length may need to be adjusted. These form an atomic unit, and LogSvc 358 may package these two actions into one write call to shared storage 304.

LogSvc 358 may be configured to serve two types of requests, 1) requests from a LogSvc client and 2) requests from read replicas. A request from a LogSvc client may be read from a log stream and may cause the LogSvc 358 to checkpoint its log. This may result in storing any suitable logs (e.g., WAL records and/or AFS logs) to shared storage 304. A request from a read replica may include the read replicas replay status that indicates the last WAL record and/or AFS record that was processed by that read replica. The LogSvc 358 may be configured to store this data in local memory and/or at the shared storage 304. The LogSvc 358 of a read replica may be configured to identify the primary server from a configuration file and to subscribe, over a network, to the message channel(s) from the primary (e.g., the message channels corresponding to the WAL record metadata and AFS journal records depicted in FIGS. 2 and 4). Once subscribed, the read replica may process records that are received via the message channel(s) and replay them to synchronize their in-memory state.

In some embodiments, WAL AFS 352 may execute input/output calls to obtain/store AFS journal records from WAL volume 306 of shared storage 304. WAL AFS 352 may store AFS journal records received from a primary and/or obtained from the WAL volume 306. In some embodiments, AFS journal records are not stored in page cache 342. In some embodiments, data AFS 356 may be configured to execute input/output calls to obtain/store data from data volume 308 of shared storage 304. In some embodiments, WAL AFS 356 may be configured to maintain AFS journal records and/or any suitable association between a page and a AFS journal record such that AFS records that do not correspond to a particular page (e.g., a page of page cache 342) may be ignored. The data corresponding to the AFS journal records may be stored in data AFS 354.

In some embodiments, WAL DB 356 may include a key-value store that may be utilized to index and store WAL records by page number. By way of example, WAL DB 356 may be an example of RocksDB, which is an example of a high performance embedded database for key-value data. In some embodiments, each WAL record may be indexed by numerous data values (e.g., {tablespace, database, relation, fork, pageNum}) any suitable combination of which may be stored by WAL DB 356 and utilized to lookup the other associated values. In some embodiments, data corresponding to WAL records may be inserted into the index maintained by WAL DB 356 by a PostgreSQL recovery loop (e.g., initiated by the PostgreSQL engine 310) when the loop receives a new WAL record from a primary server. As a non-limiting example, when a page needs to be reconstructed, the PostgreSQL engine 310 may read the page from shared storage 304, store the page in the page cache 342, fetch WAL records from WAL DB 356 (via a procedure/function call to database engine (Aries) 350) that match a page identifier (as identified from the index maintained by WAL DB 356). The changes corresponding to the records may then then be applied to the page.

Once a primary performs a checkpoint (e.g., an update of the highest LSN that has been processed by all read-replicas and a resulting flush of the WAL records that occurred up to and including the highest LSN processed by all read-replicas), it is guaranteed that all the pages on shared storage are at least up-to-date the checkpoint LSN. It may be unnecessary to index WAL records in WAL DB 356 and/or WAL AFS 352 that are older than the checkpoint LSN. In some embodiments, a garbage collection process may be initiated and configured to remove/delete WAL records from the index that individually correspond to an LSN that occurred before the checkpointed LSN. This garbage collection may be executed by a key-value store data manager of WAL DB 356 and/or WAL AFS 352 based on the key-value store manager embedding the LSN as a user-defined timestamp. The key-value data manager (e.g., RocksDB) may natively support the ability to purge record versions older than a specific timestamp.

Database engine (Aries) 350 may be launched by a process of PostgreSQL engine 310 and/or as part of the startup of server 302. The database engine (Aries) 350 may be configured to host the Aries File System and may be accessible via a fast-path pipeline via an internal procedure call and via slow-path pipeline (e.g., via FUSE 322, a Linux fuse mount point). Database engine (Aries) 350 may have access to PostgreSQL shared memory space and its corresponding constructs like locks, semaphores, signal handling mechanisms, and the like.

In some embodiments, the Slow Path Fuse Module 362 and LIB FUSE 364 utilized by database engine (Aries) 350 may provide access to the shared storage volumes of shared storage 304 through a FUSE Implementation, while GLIBC 368 may facilitate system calls and interaction between the database engine (Aries) 350 and the AFS.

Server 302 may include PSQL agent 330, an example of the PSQL agents 240-244 described above in connection with FIG. 2. The PSQL agent 330 may be configured to act as a conduit between the Aries PostgreSQL control plane and the data plane managed by database engine (Aries) 350. PSQL Agent 330 may be configured to provide Aries PostgreSQL life cycle management, configuration management, health monitoring, PostgreSQL role management, or the like.

Figure 4:
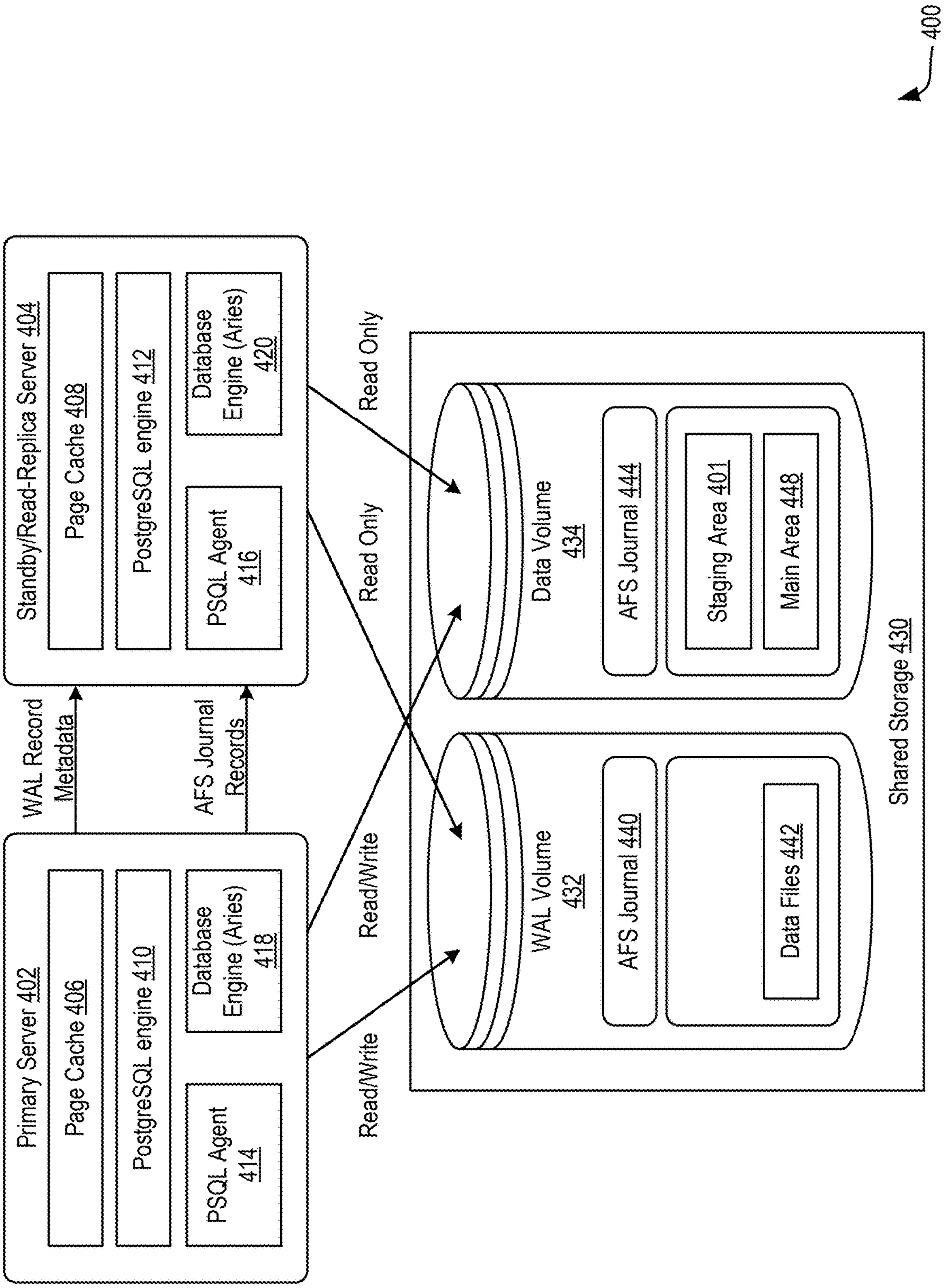
FIG. 4 illustrates an example architecture comprising a staging area that is accessible to a primary server and one or more standby/read-replica servers, according to at least one embodiment, according to at least one embodiment.

FIG. 4 illustrates an example architecture comprising a staging area (e.g., staging area 401) accessible to a primary server (e.g., primary server 402) and one or more standby/read-replica servers (e.g., standby/read-replica server 404, referred to as "read-replica 404," for brevity), according to at least one embodiment. Primary server 402 is intended to be an example of the primary servers 202 and server 302 of FIGS. 2 and 3. Read-replica server 404 is intended to be an example of the standby/read-replica servers 204, 206, and server 302 of FIGS. 2 and 3, respectively. Page cache 406, PostgreSQL engine 410, PSQL agent 414, and database engine (Aries) 418 are intended to be examples of the corresponding components discussed in connection with the primary server 202 of FIG. 2 and the server 302 of FIG. 3. Page cache 408, PostgreSQL engine 412, PSQL agent 416, and database engine (Aries) 420 are intended to be examples of the corresponding components discussed in connection with the standby/read-replica servers 204 and 206 of FIG. 2 and the server 302 of FIG. 3.

In some embodiments, the primary server 402 may be configured to handle both read and write operations. The primary server 402 may store frequently accessed data pages (e.g., within page cache 406, an example of the page cache 342 of FIG. 3), which may help reduce disk input/output processing, and which may also improve query performance. Files may be split into pages (or blocks) which represent a minimum amount of data (e.g., 8 KB, by default) that can be read or written to disk/file. The primary server 402 may execute an instance of PostgreSQL engine 410 (e.g., PostgreSQL engine 310 of FIG. 3) that may be configured to handle database operations and a database engine (Aries) 418 (e.g., database engine (Aries) 350 of FIG. 3) that may be configured to manage write-ahead logging (WAL) records, AFS journal records, data updates, and interactions with shared storage 430. The PSQL agent 414 (e.g., PSQL agent 330 of FIG. 3) may assist with managing database connections and coordinating replication processes with the standby/read-replica servers. WAL records may be leveraged for crash recovery and replication, where the WAL records describe changes to the database that have yet to be flushed (e.g., moved) to permanent storage. WAL records may be appended to WAL log files as each record is written. The insert position may be described by a Log Sequence Number (LSN) that may be a byte offset into the logs, increasing monotonically with each record. AFS journal records may be utilized for crash recovery and replication, where the AFS records describe changes to the Aries File System that have yet to be flushed (e.g., moved) to permanent storage. AFS records may be appended to AFS log files as each record is written. The insert position may be described by a Log Sequence Number (LSN) that may be a byte offset into the logs, increasing monotonically with each record.

Primary server 402 may be configured to write WAL records and/or AFS journal records describing changes to the database and/or file system associated with a received write request and may notify read-replicas of the update (e.g., via a communication channel specific to WAL records, via a communication channel specific to AFS journal updates and separate from the WAL records channel). In some embodiments, primary server 402 may stream or otherwise transmit or publish WAL record metadata including the WAL record and/or AFS journal metadata including AFS journal records to any suitable read-replica (e.g., standby/read-replica server 404). Primary server 402 may apply the changes to build a local data copy and update its in-memory state. Primary server 402 may be configured to track each read-replica's state and to perform cleanup operations on WAL files, deleted tuples, tables, and database files.

As discussed above, conventional PostgreSQL works under the assumption that the database files are exclusively owned by a database instance and that there are no other PostgreSQL servers simultaneously reading from the same database storage (i.e. shared-nothing storage architecture). By contrast, the disclosed techniques enable primary server 402 and standby/read-replica server 404 to share access to the block volumes that hold the database pages and write-ahead logs. In the disclosed multi-node database system setup of N+1 nodes (one writer such as the primary server 402 and N read-replicas including the standby/read-replica server 404) only one copy of the database is maintained. A new read-replica does not need its own data copy which greatly reduces the time needed to provision a read-replica over conventional PostgreSQL systems.

As discussed above, primary server 402 and read-replica 404 may be configured to access shared storage 430 (e.g., an example of the shared storage 207 of FIG. 2 and the shared storage 304 of FIG. 3). Shared storage 430 may include WAL volume 432 (e.g., the WAL volume 224 of FIG. 2, the WAL volume 306 of FIG. 3, etc.) and data volume 434 (e.g., the data volume 222 of FIG. 2, the data volume 308 of FIG. 3, etc.). WAL volume 432 may be configured to store Aries File System (AFS) journal metadata (e.g., AFS records) within an AFS journal specific partition (e.g., AFS journal 440, AFS journal 444) and data files 442 (e.g., WAL records) within a partition separate from AFS journal 440. Data volume 434 may be configured to store AFS journal data with an AFS journal specific partition (e.g., AFS journal 444) and data files corresponding to the database within staging area 401 and/or main area 446. AFS may be implemented as a shared library that links into the database engine (Aries) 350. The primary server 402 and read-replica 404 may mount the shared storage volume (e.g., shared storage 430) for reading.

Primary server 402 may mount the shared storage 430 in a read-write mode while all the read-replica nodes may mount the shared storage 430 in a read-only mode. Changes to the filesystem (e.g., creating a file, or allocating an extent to a file, etc.) may be journaled in AFS and the journal records/updates may be shipped to the replica nodes (e.g., via LogSvc 358 of FIG. 3). The replica nodes may replay the journal entries to keep their in-memory metadata up to date and to gain visibility into the changes that happened on the primary server 402. As the AFS journal fills up the log partition, checkpointing may be periodically done (e.g., by the primary server 402) in the background to free up space (e.g., by truncating entries from the head of the journal). The journal records may include filesystem metadata changes such as data pertaining to extents, files, open files, free extents, and the like. Journal records may be batched in a single write request (referred to as "LSNSegment") and may be appended to the tail of the AFS journal (e.g., AFS journal 440, AFS journal 444, etc.).

The AFS data partitions (e.g., AFS journal 440, AFS journal 444) of WAL volume 432 and data volume 434 may include any suitable number of regions. Each region may be a predefined size (e.g., ~1 GB) which may be the smallest incremental unit of a resize operation. Each region (except the last region) may include any suitable number of data extents (e.g., 1024 1 MB data extents). An extent refers to the minimum allocation unit for a file. Metadata may be included at the beginning of each region that describes the region followed by the actual data extents.

Staging Area

Read-replicas may need to reconstruct an exact version of the page (not a newer or an older version). As discussed above, conventional PostgreSQL implementations require that the primary server maintain WAL records and data that may be needed at the read-replica servers until every read-replica has processed the corresponding change. The primary server 402 may track the Log Sequence Number (LSN) for the records replayed by each server. Conventionally, the primary server may be configured to refrain from writing versions of pages that are newer than the version that any of the read replicas might want to reconstruct. However, if the primary server 402 is restricted from flushing newer versions of pages, then the primary server 402 may not be able to evict dirty pages from its page cache or checkpoint its state (e.g., flush dirty pages from its page cache and maintain/update its state to indicate a highest LSN that has been processed by all read-replica servers). These restrictions cause the primary server to be dependent on the processing speed of the slowest read replica.

The utilization of a staging area (e.g., staging area 401) is intended to enable the primary server 402 to write data at its own pace, while still ensuring that read-replicas maintain synchronization. The staging area 401 may store changes that at least one read-replica needs to replay. Although not depicted, the staging area 401 may include any suitable combination of:

1) A staging data log file: an internal file into which new data pages are appended.
2) A staging metadata log file: an internal file to which metadata entries are appended.
3) An in-memory metadata: a map that indicates the dataFileOffset of a memory location at which the data corresponding to a Log Sequence Number (LSN) and a given page number is stored (e.g., (pageNum, LSN)→dataFileOffset)).

In some embodiments, read/write interface calls (e.g., performed directly by the PostgreSQL engine 410 or via the database engine (Aries) 418) may be modified to be LSN aware. The minimum LSN for each read-replica may be maintained at data volume 434 (e.g., within staging area 401, within AFS Journal 444, or the like). A background process may be utilized to track the LSNs that correspond to the last WAL record processed by each of the read-replicas. From this information, the background process may determine a minimum LSN ("minLSN") that indicates the latest log sequence number that corresponds to a WAL record that has been processed by all read replicas. The background process may be configured to determine which data within the staging area 401 corresponds to an LSN that is later/older than the min LSN. The background process may monitor and update the LSNs processed for each read-replica and update the minimum LSN over time. As the min LSN progresses, a background process (e.g., background writer 530 of FIG. 5) may permanently delete tombstoned files. In some embodiments, "a tombstoned file" refers to a file that has been deleted by the primary server 402 from its page cache, but that may be retained within the staging area 401 to ensure that all replicas have finished replaying before deleting the WAL record. When the primary wishes to write a data page, it may issue a write request to the management service of the data volume 434 with the page's corresponding LSN (e.g., "pageLSN"). If the page's LSN (pageLSN) is less than the minLSN indicating the highest LSN that has already been processed by every read-replica, then the page may be written directly to a location in with main area 448. If pageLSN is greater than or equal to the minLSN, then the data may be written to the staging area 401.

The primary server 402 may write/stream WAL records to any suitable number of read-replicas and/or store these WAL records within WAL DB 356 and/or WAL volume 432 of shared storage 430. The WAL records stored at WAL volume 432 may be accessible by any suitable read replica (e.g., standby/read-replica server 404). WAL records may be streamed to the standby/read-replica server 404 from the primary server 402 or retrieved from data files 442 of shared storage 430, enabling the read replicas to apply the updates and synchronize the data stored in local memory. While the read replicas may receive WAL records from the primary server 402, they may obtain these WAL records from the shared storage 430, such as during times when the network is slow and receiving WAL records from the primary server 402 may be delayed.

In some embodiments, the staging area 401 may be configured to store changes to database pages that cannot yet be committed to the main area 448 because one or more read replicas (e.g., standby/read-replica server 404, etc.) have not caught up. When the primary server 402 identifies a page in its page cache 406 that needs to be flushed (e.g., identifies a page that needs to be written to data volume 434), it may be configured to detect that the page's LSN (Log Sequence Number) is higher than the min LSN corresponding the highest/most-recent LSN that has processed by all of the read replicas. If so, the primary server 402 may be configured to store the page within the staging area 401. The AFS Journal 444 may be utilized to track these changes, ensuring that the replicas are aware of the staged pages and can access them as needed.

When a page needs to be inserted into the staging area 401, the database engine (Aries) 418 may be configured to cause the new page to be written to the staging area 401, to update a staging data log file (not depicted), to insert a new entry into the in-memory map maintained by the data volume 434, and to log the metadata from this write into the AFS journal 444. After these operations are complete, insertion of the new page within the staging area 401 may be considered successful. Read replica servers (e.g., read replica 404) may replay the AFS journal entry from AFS journal 444 and also update their in-memory metadata.

In a fast-path implementation for I/O to the Aries filesystem of data volume 434, the PostgreSQL engine 410 may directly perform the I/O operations to data volume 434 without having to do a context switch to the AFS process (e.g., without utilizing the database engine (Aries) 418). When a mapping for the page is found by the PostgreSQL engine 410 from data obtained from the in-memory map stored in data volume 434), an internal procedure call to database engine (Aries) 418 can be avoided.

For a fast-path implementation, the metadata (e.g. the mapping of page LSN to memory location) may be maintained in the staging area 401 and may be accessible to the primary server 402 and read replica 404. In some embodiments, the mapping between page LSN to storage location (e.g., within data volume 434) may be stored in local memory at the primary server 402, within the data volume 434, and a bloom filter may also be stored in data volume 434. Subsequent read operations may first consult the bloom-filter to determine whether the page number exists in data volume 434 (e.g., within staging area 401). If there's a match, then a procedure call may be executed to call the functionality of the database engine (Aries) 350. If not, then the fast-path implementation process may proceed.

In some embodiments, the database engine (Aries) 418 may compare the pageLSN with the stagingTruncateLSN (e.g., the LSN of the latest changes that were flushed/moved from the staging area 401 to the main area 448). If the page belongs in the staging area (e.g., the pageLSN>=the min LSN and the pageLSN>stagingTruncateLSN) then the database engine (Aries) 418, may write the data to the staging area 401. If the page does not belong to the staging area 401, the database engine (Aries) 418 may write the data directly to the main area 448. An in-memory map that indicates the location of a page corresponding to an LSN may be updated to reflect the storage location of the page.

When a page needs to be read from data volume 434, the reading node (e.g., the primary server 402 or a read-replica such as standby/read-replica server 404) may be configured to inspect the in-memory map of staging area 401 to determine whether a mapping exists for the requested page. If a mapping exists, the data may be obtained from staging area 401. Otherwise, when the mapping does not exist, the data may be obtained from main area 448.

It should be appreciated that there may be instances in which multiple versions of the same page may be stored within the staging area 401. Each read-replica may find the latest version of the page with a page LSN<replica.replayLSN (e.g., the last LSN replayed by a given replica) and read that version of the page. In some embodiments, pages inserted into the staging area 401 (e.g., a partition or other data file for maintaining data separate from the main area 448 of data volume 434) may not be in strictly increasing LSN order. In some embodiments, the primary server 402 may decide to flush a page with a higher LSN before flushing another page with a lower LSN.

Figure 5:
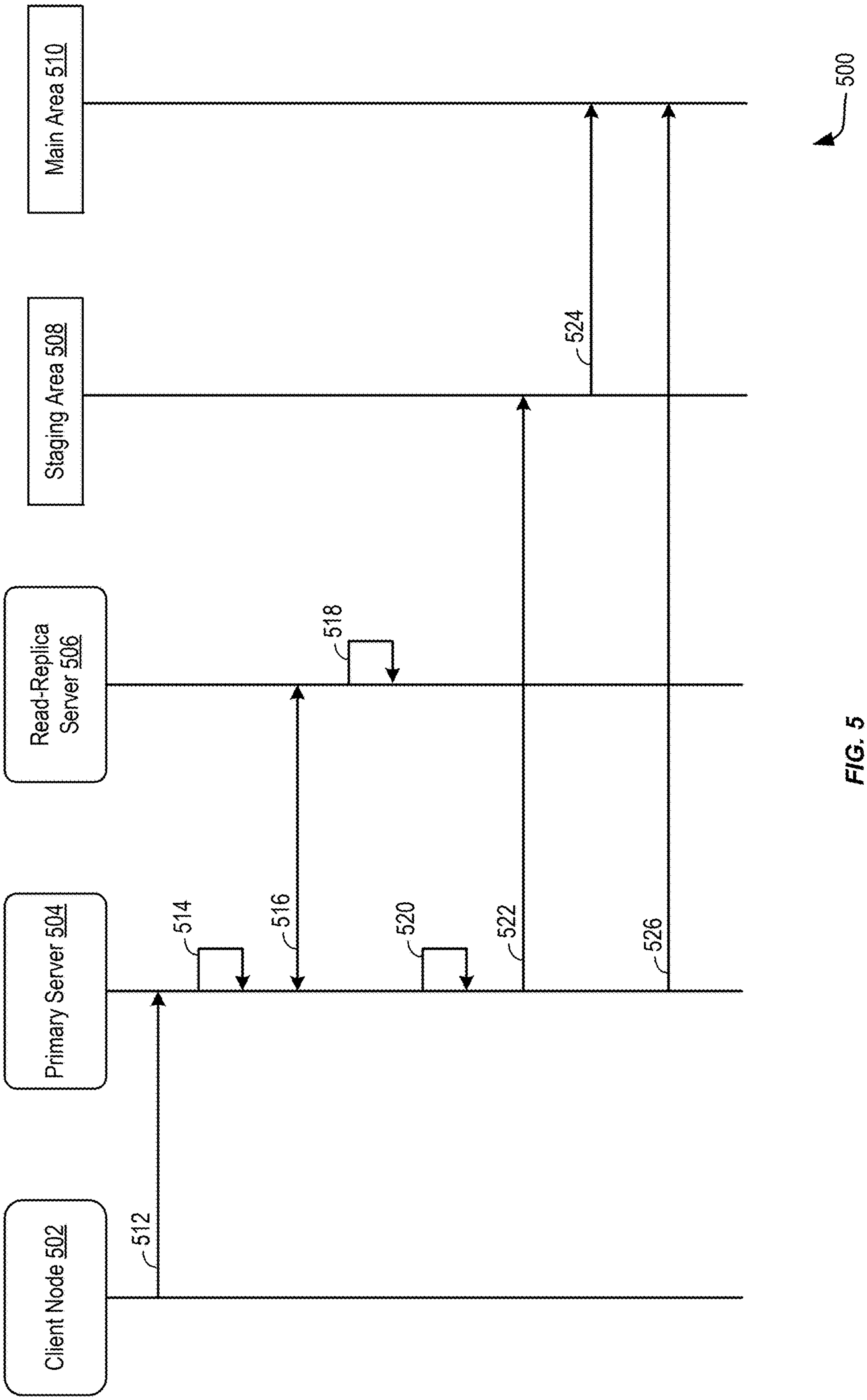
FIG. 5 is a block diagram illustrating an example method for performing a write operation in a PostgreSQL-compatible object-relational database management system (ORDBMS), according to at least one embodiment.

FIG. 5 is a block diagram illustrating an example method 500 for performing a write operation in a PostgreSQL-compatible object-relational database management system (ORDBMS), according to at least one embodiment. The method 500 may be performed by the client node 502 (e.g., a client device such as a desktop computer, tablet, smartphone, or the like), primary server 504 (e.g., primary server (AD1) 202 of FIG. 2), read-replica server 506 (e.g., standby/read-replica server (AD2) 204 of FIG. 2), staging area 508 (e.g., staging area 401 of FIG. 4), and main area 510 (e.g., main area 448 of FIG. 4.). Staging area 508 and main area 510 may be part of a shared block storage volume that is accessible to the primary server 504 and the read-replica server 506. Prior to performing method 500, the read-replica server 506 may receive WAL records and/or Aries filesystem (AFS) records from the primary server 504 on an ongoing basis. The read-replica server 506 may run an instance of a PostgreSQL engine (e.g., PostgreSQL engine 412 of FIG. 4) and a database engine (Aries) (e.g., database engine (Aries) 420 of FIG. 4) to process the incoming WAL records and/or AFS records and apply them to its local state (referred to as "materialization" or "materializing a page"). A page cache (e.g., page cache 408 of FIG. 4) on the read-replica server 506 may store frequently read data pages to improve query performance. The read-replica server 506 may read from a shared block storage volume including the staging area 508 and the main area 510 but may be restricted from writing to said volume. While the primary server 504 may read or write from the shared block storage volume at any suitable time.

The method 500 may begin at 512, where a write request is received by the primary server 504 from the client node 502. In some embodiments, the write request may be communicated to the primary server 504 by an intermediate component (e.g., one of CP/Mgmt plane worker nodes 250 of FIG. 2).

At 514, the primary server 504 may update local cache (e.g., page cache 406 of FIG. 4, WAL DB 356 of FIG. 3, WAL AFS 352 of FIG. 3, etc.) with a journal record corresponding to the change that is being requested by the write request.

At 516, the primary server 504 may communicate the journal record (e.g., a WAL record, an AFS record, etc.) to one or more read-replica servers (e.g., read-replica server 506). In some embodiments, the primary server 504 may transmit the journal record via a communication channel (e.g., a stream) that is dedicated to such journal entries). As another example, the primary server 504 may provide the WAL record and/or journal record to the read-replica server 506 by request.

At 518, the read-replica server 506 may read the incoming record(s) from primary server 504 and then replays the record(s) on its own local storage to bring the data up to date. The read-replica server 506 may transmit (e.g., to the primary server 504, the shared storage 430 of FIG. 4, etc.) a log sequence number corresponding to the record to indicate the last record it has successfully replayed. Each LSN provided by read-replica server (e.g., the read-replica server 506) may be stored in the shared block storage volume and/or in memory at the primary server 504.

At 520, primary server 506 may execute operations to determine whether to write the data to staging area 508 or main area 510. When the primary server 506 wants to write a data page, it may issue a write request to the database engine (Aries) 350 of FIG. 3 with the Log Sequence Number ("pageLSN") corresponding to the change to the page being requested.

At 522, when the pageLSN is greater than or equal to the minimum LSN replayed by all of the read-replicas, then the page may be written into a staging area 508 (e.g., the page may be appended to a staging data log file of staging area 508). In some embodiments, the page may be appended to a log file of the main area 510. As the read-replica servers continue to update the last LSN that they replayed, the minimum LSN for the shared block storage volume advances. The primary server 504 may update its in-memory map to indicate a mapping of the page number and LSN corresponding to the page to a data file offset indicating a location within the staging area 508. The primary server 504 may also log the metadata corresponding to this write to an AFS journal (e.g., AFS journal 440 and/or 444 of FIG. 4). This AFS journal may be communicated to the read-replica server 506 at any suitable time.

At 524, after the minimum LSN has advanced, one or more pages stored within the staging area 508 may be identified based at least in part on being associated with an LSN that is less than the minimum LSN. These pages may be evicted (e.g., moved) to main area 510. This eviction may occur based at least in part on a predefined schedule, frequency, or at any suitable time.

If the pageLSN is less than the minimum LSN maintained by the shared storage (e.g., an earliest LSN that has been replayed by all of the read-replica servers, including read-replica server 506) then the method 500 may proceed from 520 to 526, where the page can be written directly to main area 510. In some embodiments, the page may be appended to a log file of the main area 510. The primary server 504 may update its in-memory map to indicate a mapping of the page number and LSN corresponding to the page to a data file offset indicating a location within the main area 510. The primary server 504 may also log the metadata corresponding to this write to an AFS journal (e.g., AFS journal 440 and/or 444 of FIG. 4). This AFS journal may be communicated to the read-replica server 506 at any suitable time.

Figure 6:
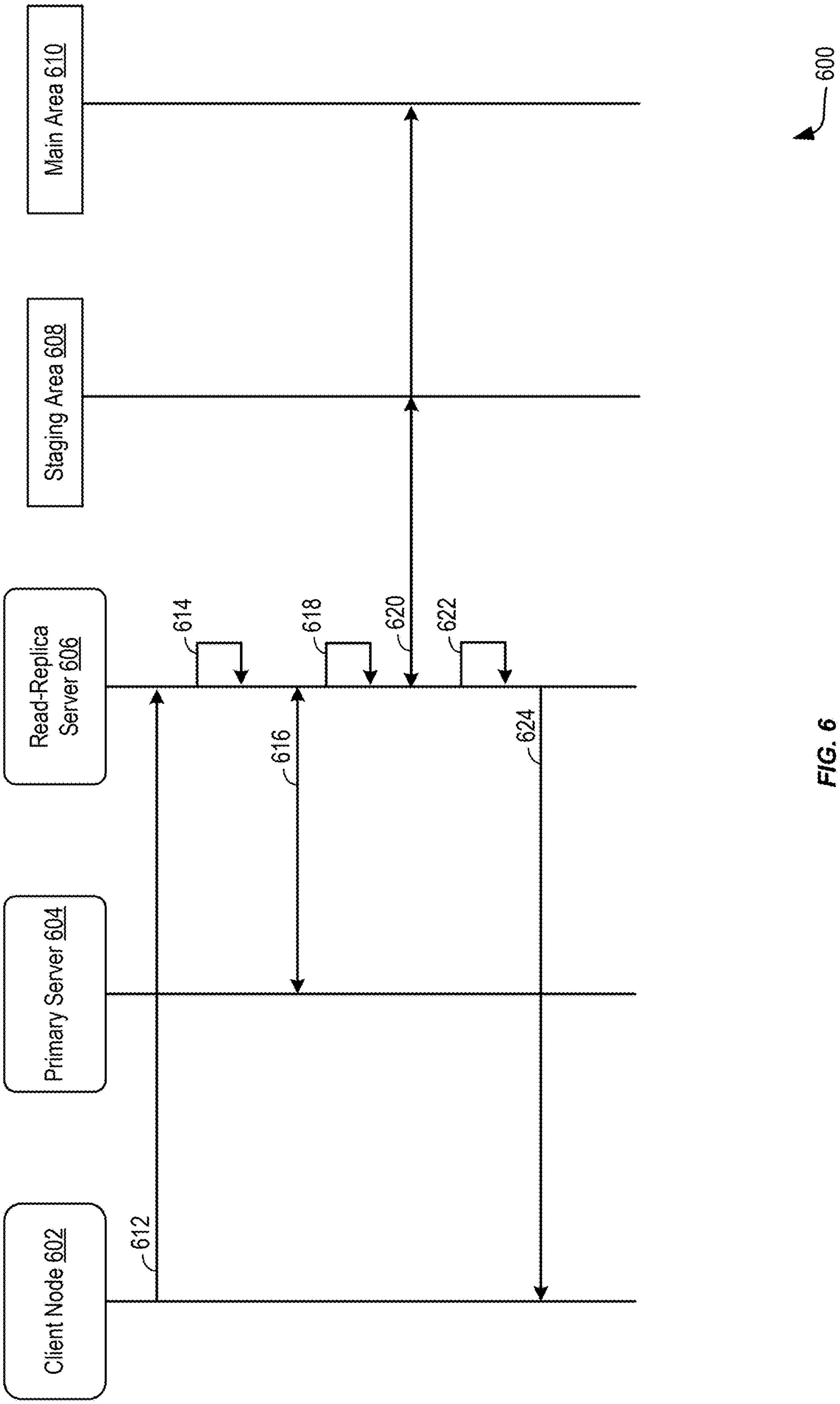
FIG. 6 is a block diagram illustrating an example method for performing a read operation in a PostgreSQL-compatible object-relational database management system (ORDBMS), according to at least one embodiment.

FIG. 6 is a block diagram illustrating an example method 600 for performing a read operation in a PostgreSQL-compatible object-relational database management system (ORDBMS), according to at least one embodiment. The method 600 may be performed by the client node 602, primary server 604 (e.g., primary server (AD1) 202 of FIG. 2), read-replica server 606 (e.g., standby/read-replica server (AD2) 204 of FIG. 2), staging area 608 (e.g., staging area 401 of FIG. 4), and main area 610 (e.g., main area 448 of FIG. 4.). Staging area 608 and main area 610 may be part of a shared block storage volume that is accessible to the primary server 604 and the read-replica server 606. Prior to performing method 600, the read-replica server 606 may receive WAL records and Aries filesystem (AFS) journal records from the primary server 604 on an ongoing basis. The read-replica server 606 may run an instance of a PostgreSQL engine (e.g., PostgreSQL engine 412 of FIG. 4) and a database engine (Aries) (e.g., database engine (Aries) 420 of FIG. 4) to process the incoming WAL records and/or AFS records and apply them to its local state (referred to as "materialization" or "materializing a page"). A page cache (e.g., page cache 408 of FIG. 4) on the read-replica server 606 may store frequently read data pages to improve query performance. The read-replica server 606 may read from the shared block storage volume but may be restricted from writing to said volume. While the primary server 604 may read or write from the shared block storage volume at any suitable time.

The method 600 may begin at 612, where a read request is received by the client node 602 and provided to the read-replica server 606, directly, or via primary server 604. In some embodiments, the read request may be communicated to the primary server 504 by an intermediate component (e.g., one of CP/Mgmt plane worker nodes 250 of FIG. 2).

At 614, the read-replica server 606 may determine whether the requested data corresponding to the read request is stored in local memory (e.g., the page cache 408). If so, the read-replica server 606 may determine whether any WAL records exist corresponding to the data page associated with the read request. WAL records may be received from the primary server 604 at any suitable time. In some embodiments, the read-replica server 606 may request WAL records corresponding to the data page at 616 and receive from the primary server 604 any suitable number of WAL records corresponding to the data page).

If the data page is stored in local memory, the method 600 may proceed to 622.

If the data page is not already in local memory when the determination is made at 614, the method 600 may proceed to 620, where the read-replica server 606 may request the data page from shared storage. If the Log Sequence Number (LSN) associated with the page is less than a minimum LSN (the earliest LSN already replayed by all read-replica servers) corresponding to the shared block storage volume, the data page may be retrieved from the main area 610. Alternatively, when the LSN is greater than or equal to the minimum LSN, the data page may be retrieved from the staging area 608.

At 622, the read-replica server 606 may replay the WAL records corresponding to the data page to update the data page in local memory.

At 622, the read-replica server 606 may provide a response to the read request based at least in part on the data page now updated in its local memory.

Figure 7:
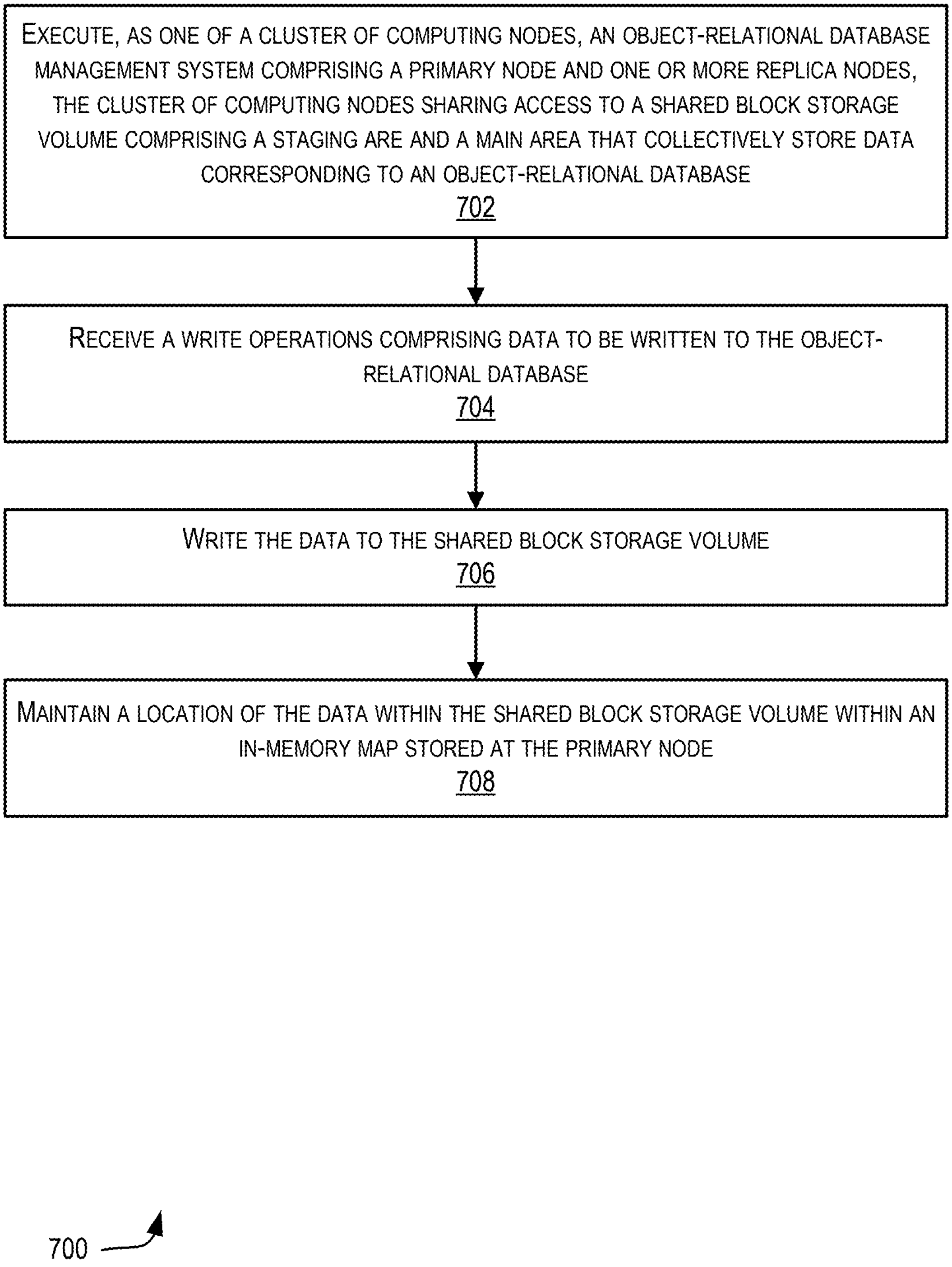
FIG. 7 is a block diagram illustrating an example method for performing a write operation in a PostgreSQL-compatible object-relational database management system (ORDBMS), according to at least one embodiment.

FIG. 7 is a block diagram illustrating an example method for performing a write operation in a PostgreSQL-compatible object-relational database management system (ORDBMS), according to at least one embodiment. The method 700 may be performed by primary servers of FIG. 2-6. Each of the primary servers may be an example of a computing device comprising one or more processors and one or more memories that store computer-executable instructions that, when executed by the one or more processors, cause the one or more processors to perform the steps/operations of method 700. In some embodiments, the method 700 may include more or fewer steps than the number depicted in FIG. 7. It should be appreciated that the steps of method 700 may be performed in any suitable order.

The method 700 may begin at 702, where the one or more processors execute, as one of a cluster of computing nodes of a cloud computing environment, an object-relational database management system (ODMS) (e.g., a PostgreSQL ODMS, a system comprising the components depicted in FIGS. 2-6) comprising a primary node and one or more replica nodes. In some embodiments, the cluster of computing nodes share access to a shared block storage volume comprising a staging area (e.g., staging area 401 of FIG. 4) and a main area (e.g., main area 448 of FIG. 4). In some embodiments, the staging area and the main area collectively store data corresponding to an object-relational database.

At 704, a write operation comprising data to be written to the object-relational database may be received (e.g., by the PostgreSQL engine 310 of FIG. 3). The write operation may be processed by a database engine (e.g., database engine (Aries) 350 of FIG. 3, a database engine that is called by the PostgreSQL engine 310 of FIG. 3).

At 706, the data may be written (e.g., by the database engine) to the shared block storage volume. In some embodiments, the data is written to the staging area within the shared block storage volume when a log sequence number associated with the data is greater than a minimum log sequence number associated with the staging area. In some embodiments, the data is written to the main area within the shared block storage volume when the log sequence number associated with the data is less than or equal to the minimum log sequence number associated with the staging area.

At 708, a location of the data within the shared block storage volume is maintained within an in-memory map stored at the primary node (e.g., data AFS 354). Change records corresponding to the changes performed by the write operations may be stored in WAL AFS 352 and/or WAL DB 356 of FIG. 3.

Figure 8:
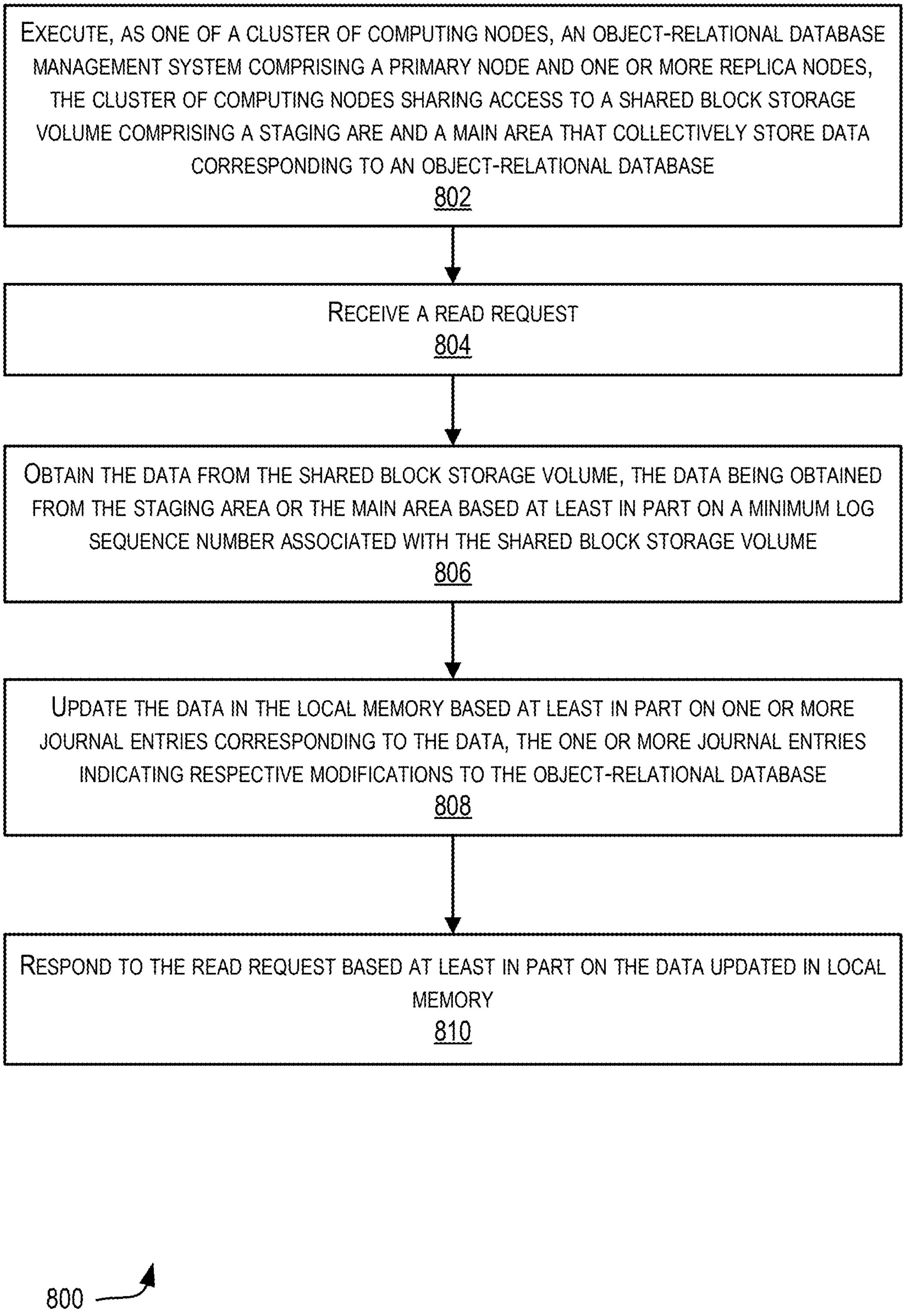
FIG. 8 is a block diagram illustrating an example method for performing a read operation in a PostgreSQL-compatible object-relational database management system (ORDBMS), according to at least one embodiment.

FIG. 8 is a block diagram illustrating an example method for performing a read operation in a PostgreSQL-compatible object-relational database management system (ORDBMS), according to at least one embodiment. The method 800 may be performed by primary servers of FIG. 2-6. Each of the primary servers may be an example of a computing device comprising one or more processors and one or more memories that store computer-executable instructions that, when executed by the one or more processors, cause the one or more processors to perform the steps/operations of method 800. In some embodiments, the method 800 may include more or fewer steps than the number depicted in FIG. 8. It should be appreciated that the steps of method 800 may be performed in any suitable order.

The method 800 may begin at 802, the one or more processors execute, at least a portion of an object-relational database management system (ODMS) (e.g., a PostgreSQL ODMS, a system comprising the components depicted in FIGS. 2-6) comprising a primary node and one or more replica nodes. In some embodiments, the cluster of computing nodes share access to a shared block storage volume comprising a staging area (e.g., staging area 401 of FIG. 4) and a main area (e.g., main area 448 of FIG. 4). In some embodiments, the staging area and the main area collectively store data corresponding to an object-relational database.

At 804, a read request may be received (e.g., by the read-replica server of FIGS. 2-6 for data of the object-relational database that is stored within the shared block storage volume. The read request may be received from a primary node (e.g., primary server 604 of FIG. 6) or from a worker node (e.g., the client node 602 of FIG. 6). The read operation may be processed by a database engine (e.g., database engine (Aries) 350 of FIG. 3, a database engine that is called by the PostgreSQL engine 310 of FIG. 3).

At 806, the data may be obtained (e.g., by the database engine) from the shared block storage volume. In some embodiments, the data may be obtained from the staging area or the main area based at least in part on a minimum log sequence number associated with the shared block storage volume.

At 808, the data may be stored in local memory (e.g., page cache 342) and updated based at least in part on one or more journal entries corresponding to the data and indicating respective modifications to the object-relational database. By way of example, data may be updated based at least in part on replaying WAL records and/or AFS records obtained from WAL AFS 352 and/or WAL DB 356 of FIG. 3.

At 810, the read replica may respond to the read request based at least in part on the data updated in local memory.

Figure 9:
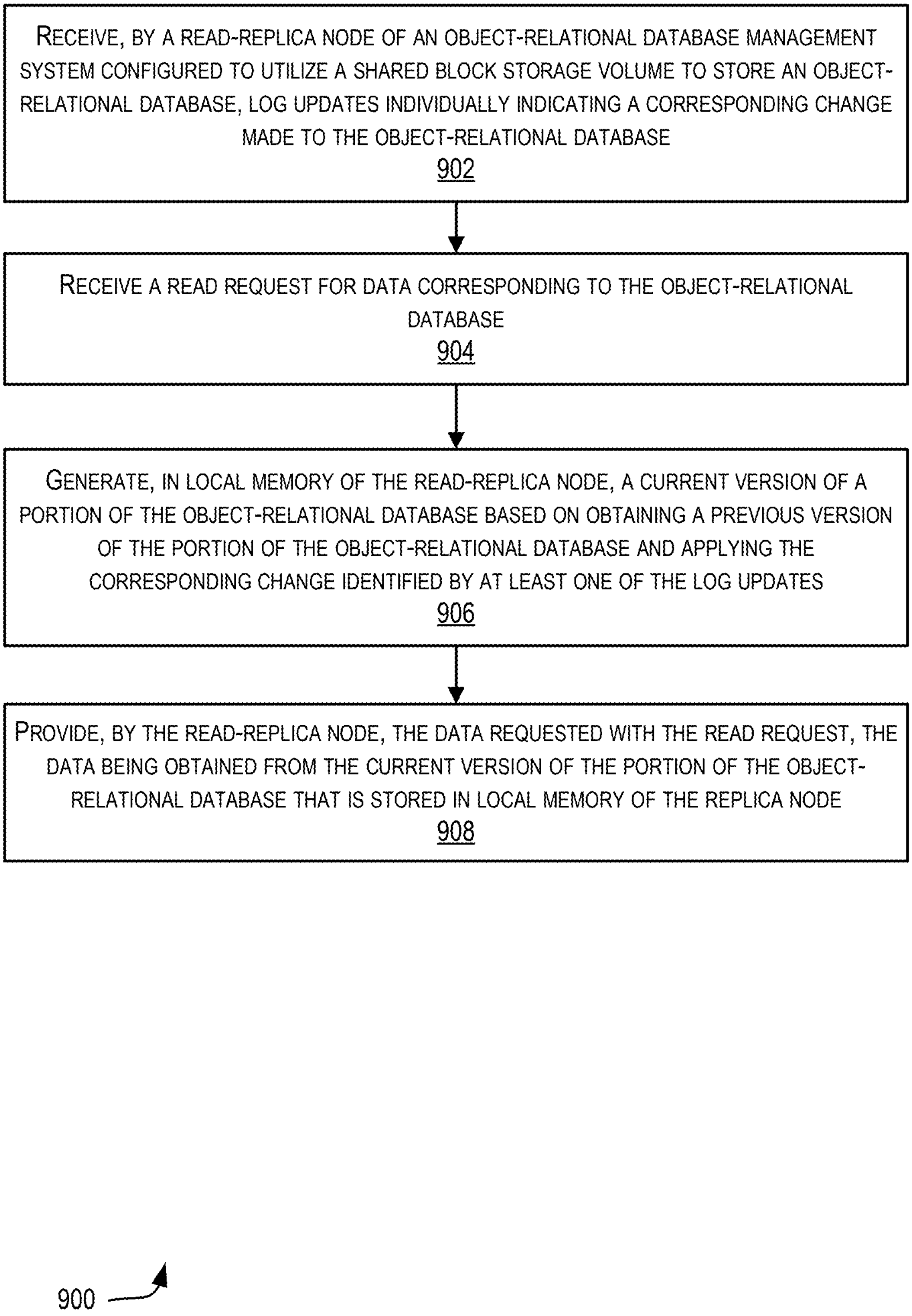
FIG. 9 is a block diagram illustrating an example method for performing inline materialization of a database page, according to at least one embodiment.

FIG. 9 is a block diagram illustrating an example method 900 for performing inline materialization of a database page, according to at least one embodiment. The method 900 may be performed by primary servers of FIG. 2-6. Each of the primary servers may be an example of a computing device comprising one or more processors and one or more memories that store computer-executable instructions that, when executed by the one or more processors, cause the one or more processors to perform the steps/operations of method 900. In some embodiments, the method 900 may include more or fewer steps than the number depicted in FIG. 9. It should be appreciated that the steps of method 900 may be performed in any suitable order.

The method 900 may begin at 902, where log updates are received by a read-replica node of an object-relational database management system (ODMS) (e.g., a PostgreSQL ODMS) configured to utilize a shared block storage volume (e.g., shared storage 430) to store an object-relational database. The log updates may individually indicate a corresponding change made to the object-relational database.

At 904, a read request for data corresponding to the object-relational database may be received (e.g., from the primary server 604 of FIG. 6, from the client node 602 of FIG. 6 via CP/Mgmt plane worker nodes of a control plane and/or management plane).

At 906, a current version of a portion of the object-relational database may be generated and stored in local memory of the read-replica node based on 1) obtaining a previous version of the portion of the object-relational databased and 2) applying the corresponding change identified by at least one of the log updates. This ensures that the tasks of replication and materialization are incorporated in the read-replica node (e.g., the process that is processing the read request).

At 908, the read-replica node may provide the data requested with the read request. In some embodiments, the data may be provided in response to the read request and may be obtained from the current version of the portion of the object-relational database that is stored in local memory of the replica node.

Conventional PostgreSQL systems pre-materialize everything, so that each replica has an updated version of the data in memory. Using the disclosed techniques ensures that materialization (e.g., the process of creating a physical copy of data from a query, or a view, in a database) occurs in response to the read query. This reduces wasted processing resources inherent in conventional PostgreSQL systems. Other conventional PostgreSQL systems utilize a page server to handle synchronization between the primary and replicas. The disclosed techniques of handling materialization in line with respect to the read query eliminate the need for these additional page servers which also eliminates this form of wasteful processing found in conventional systems.

Example IaaS Environments

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
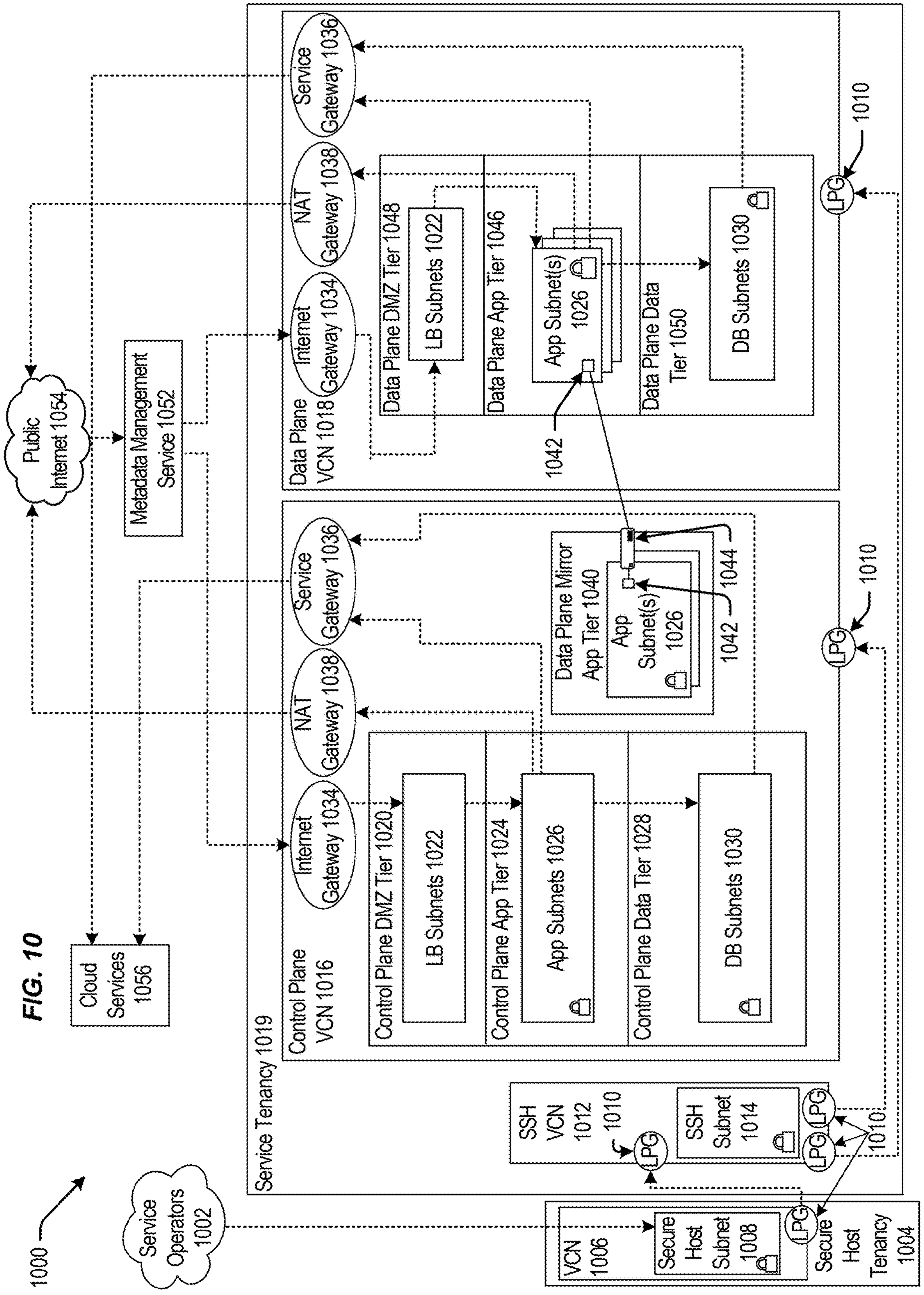
FIG. 10 is a block diagram illustrating one pattern for implementing a cloud infrastructure as a service system, according to at least one embodiment.

FIG. 10 is a block diagram 1000 illustrating an example pattern of an IaaS architecture, according to at least one embodiment. Service operators 1002 can be communicatively coupled to a secure host tenancy 1004 that can include a virtual cloud network (VCN) 1006 and a secure host subnet 1008. In some examples, the service operators 1002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1006 and/or the Internet.

The VCN 1006 can include a local peering gateway (LPG) 1010 that can be communicatively coupled to a secure shell (SSH) VCN 1012 via an LPG 1010 contained in the SSH VCN 1012. The SSH VCN 1012 can include an SSH subnet 1014, and the SSH VCN 1012 can be communicatively coupled to a control plane VCN 1016 via the LPG 1010 contained in the control plane VCN 1016. Also, the SSH VCN 1012 can be communicatively coupled to a data plane VCN 1018 via an LPG 1010. The control plane VCN 1016 and the data plane VCN 1018 can be contained in a service tenancy 1019 that can be owned and/or operated by the IaaS provider.

The control plane VCN 1016 can include a control plane demilitarized zone (DMZ) tier 1020 that acts as a perimeter network (e.g., portions of a corporate network between the corporate intranet and external networks). The DMZ-based servers may have restricted responsibilities and help keep breaches contained. Additionally, the DMZ tier 1020 can include one or more load balancer (LB) subnet(s) 1022, a control plane app tier 1024 that can include app subnet(s) 1026, a control plane data tier 1028 that can include database (DB) subnet(s) 1030 (e.g., frontend DB subnet(s) and/or backend DB subnet(s)). The LB subnet(s) 1022 contained in the control plane DMZ tier 1020 can be communicatively coupled to the app subnet(s) 1026 contained in the control plane app tier 1024 and an Internet gateway 1034 that can be contained in the control plane VCN 1016, and the app subnet(s) 1026 can be communicatively coupled to the DB subnet(s) 1030 contained in the control plane data tier 1028 and a service gateway 1036 and a network address translation (NAT) gateway 1038. The control plane VCN 1016 can include the service gateway 1036 and the NAT gateway 1038.

The control plane VCN 1016 can include a data plane mirror app tier 1040 that can include app subnet(s) 1026. The app subnet(s) 1026 contained in the data plane mirror app tier 1040 can include a virtual network interface controller (VNIC) 1042 that can execute a compute instance 1044. The compute instance 1044 can communicatively couple the app subnet(s) 1026 of the data plane mirror app tier 1040 to app subnet(s) 1026 that can be contained in a data plane app tier 1046.

The data plane VCN 1018 can include the data plane app tier 1046, a data plane DMZ tier 1048, and a data plane data tier 1050. The data plane DMZ tier 1048 can include LB subnet(s) 1022 that can be communicatively coupled to the app subnet(s) 1026 of the data plane app tier 1046 and the Internet gateway 1034 of the data plane VCN 1018. The app subnet(s) 1026 can be communicatively coupled to the service gateway 1036 of the data plane VCN 1018 and the NAT gateway 1038 of the data plane VCN 1018. The data plane data tier 1050 can also include the DB subnet(s) 1030 that can be communicatively coupled to the app subnet(s) 1026 of the data plane app tier 1046.

The Internet gateway 1034 of the control plane VCN 1016 and of the data plane VCN 1018 can be communicatively coupled to a metadata management service 1052 that can be communicatively coupled to public Internet 1054. Public Internet 1054 can be communicatively coupled to the NAT gateway 1038 of the control plane VCN 1016 and of the data plane VCN 1018. The service gateway 1036 of the control plane VCN 1016 and of the data plane VCN 1018 can be communicatively coupled to cloud services 1056.

In some examples, the service gateway 1036 of the control plane VCN 1016 or of the data plane VCN 1018 can make application programming interface (API) calls to cloud services 1056 without going through public Internet 1054. The API calls to cloud services 1056 from the service gateway 1036 can be one-way: the service gateway 1036 can make API calls to cloud services 1056, and cloud services 1056 can send requested data to the service gateway 1036. But cloud services 1056 may not initiate API calls to the service gateway 1036.

In some examples, the secure host tenancy 1004 can be directly connected to the service tenancy 1019, which may be otherwise isolated. The secure host subnet 1008 can communicate with the SSH subnet 1014 through an LPG 1010 that may enable two-way communication over an otherwise isolated system. Connecting the secure host subnet 1008 to the SSH subnet 1014 may give the secure host subnet 1008 access to other entities within the service tenancy 1019.

The control plane VCN 1016 may allow users of the service tenancy 1019 to set up or otherwise provision desired resources. Desired resources provisioned in the control plane VCN 1016 may be deployed or otherwise used in the data plane VCN 1018. In some examples, the control plane VCN 1016 can be isolated from the data plane VCN 1018, and the data plane mirror app tier 1040 of the control plane VCN 1016 can communicate with the data plane app tier 1046 of the data plane VCN 1018 via VNICs 1042 that can be contained in the data plane mirror app tier 1040 and the data plane app tier 1046.

In some examples, users of the system, or customers, can make requests, for example create, read, update, or delete (CRUD) operations, through public Internet 1054 that can communicate the requests to the metadata management service 1052. The metadata management service 1052 can communicate the request to the control plane VCN 1016 through the Internet gateway 1034. The request can be received by the LB subnet(s) 1022 contained in the control plane DMZ tier 1020. The LB subnet(s) 1022 may determine that the request is valid, and in response to this determination, the LB subnet(s) 1022 can transmit the request to app subnet(s) 1026 contained in the control plane app tier 1024. If the request is validated and requires a call to public Internet 1054, the call to public Internet 1054 may be transmitted to the NAT gateway 1038 that can make the call to public Internet 1054. Metadata that may be desired to be stored by the request can be stored in the DB subnet(s) 1030.

In some examples, the data plane mirror app tier 1040 can facilitate direct communication between the control plane VCN 1016 and the data plane VCN 1018. For example, changes, updates, or other suitable modifications to configuration may be desired to be applied to the resources contained in the data plane VCN 1018. Via a VNIC 1042, the control plane VCN 1016 can directly communicate with, and can thereby execute the changes, updates, or other suitable modifications to configuration to, resources contained in the data plane VCN 1018.

In some embodiments, the control plane VCN 1016 and the data plane VCN 1018 can be contained in the service tenancy 1019. In this case, the user, or the customer, of the system may not own or operate either the control plane VCN 1016 or the data plane VCN 1018. Instead, the IaaS provider may own or operate the control plane VCN 1016 and the data plane VCN 1018, both of which may be contained in the service tenancy 1019. This embodiment can enable isolation of networks that may prevent users or customers from interacting with other users', or other customers', resources. Also, this embodiment may allow users or customers of the system to store databases privately without needing to rely on public Internet 1054, which may not have a desired level of threat prevention, for storage.

In other embodiments, the LB subnet(s) 1022 contained in the control plane VCN 1016 can be configured to receive a signal from the service gateway 1036. In this embodiment, the control plane VCN 1016 and the data plane VCN 1018 may be configured to be called by a customer of the IaaS provider without calling public Internet 1054. Customers of the IaaS provider may desire this embodiment since database(s) that the customers use may be controlled by the IaaS provider and may be stored on the service tenancy 1019, which may be isolated from public Internet 1054.

Figure 11:
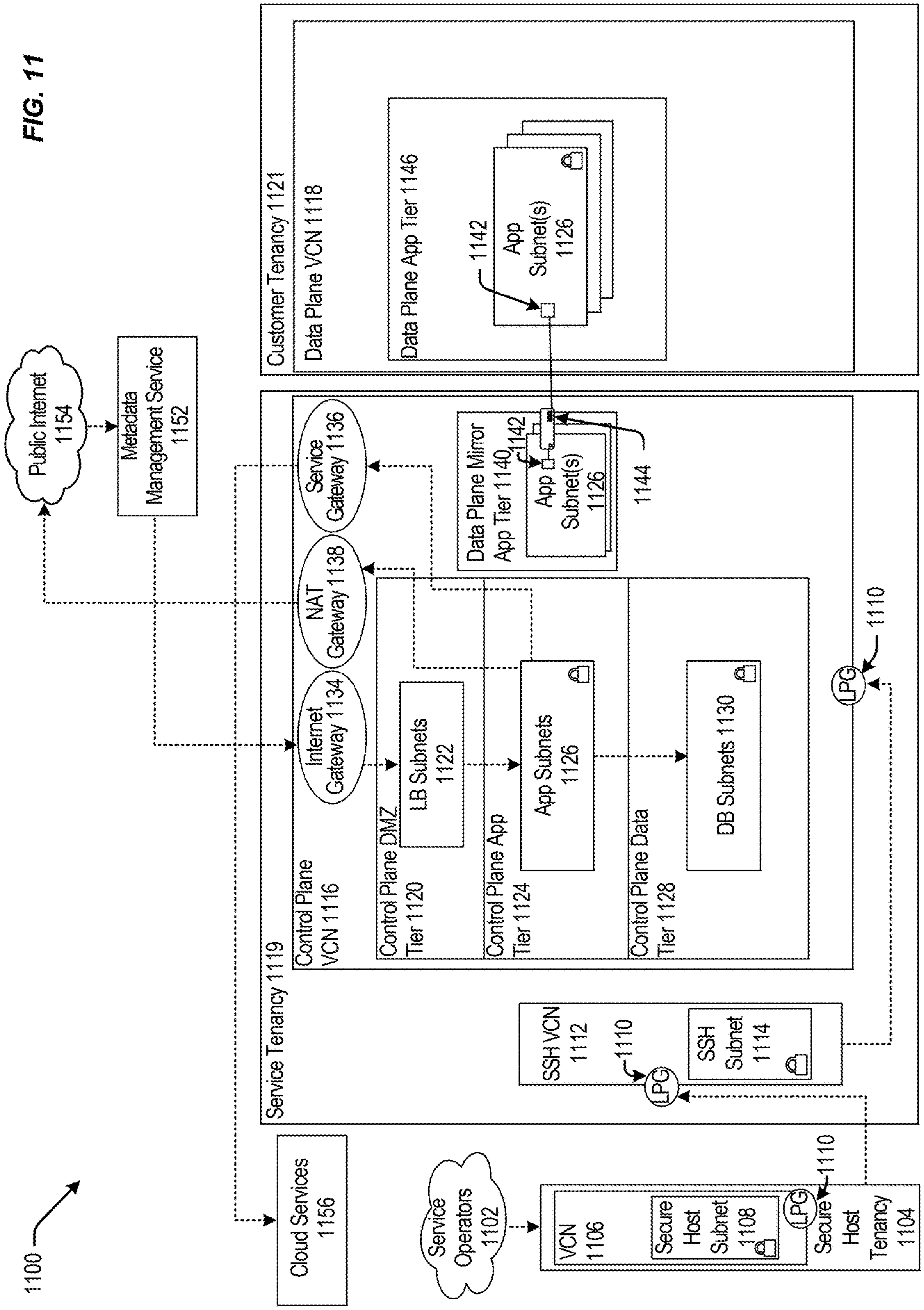
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 1002 of FIG. 10) can be communicatively coupled to a secure host tenancy 1104 (e.g., the secure host tenancy 1004 of FIG. 10) that can include a virtual cloud network (VCN) 1106 (e.g., the VCN 1006 of FIG. 10) and a secure host subnet 1108 (e.g., the secure host subnet 1008 of FIG. 10). The VCN 1106 can include a local peering gateway (LPG) 1110 (e.g., the LPG 1010 of FIG. 10) that can be communicatively coupled to a secure shell (SSH) VCN 1112 (e.g., the SSH VCN 1012 of FIG. 10) via an LPG 1010 contained in the SSH VCN 1112. The SSH VCN 1112 can include an SSH subnet 1114 (e.g., the SSH subnet 1014 of FIG. 10), and the SSH VCN 1112 can be communicatively coupled to a control plane VCN 1116 (e.g., the control plane VCN 1016 of FIG. 10) via an LPG 1110 contained in the control plane VCN 1116. The control plane VCN 1116 can be contained in a service tenancy 1119 (e.g., the service tenancy 1019 of FIG. 10), and the data plane VCN 1118 (e.g., the data plane VCN 1018 of FIG. 10) can be contained in a customer tenancy 1121 that may be owned or operated by users, or customers, of the system.

The control plane VCN 1116 can include a control plane DMZ tier 1120 (e.g., the control plane DMZ tier 1020 of FIG. 10) that can include LB subnet(s) 1122 (e.g., LB subnet(s) 1022 of FIG. 10), a control plane app tier 1124 (e.g., the control plane app tier 1024 of FIG. 10) that can include app subnet(s) 1126 (e.g., app subnet(s) 1026 of FIG. 10), a control plane data tier 1128 (e.g., the control plane data tier 1028 of FIG. 10) that can include database (DB) subnet(s) 1130 (e.g., similar to DB subnet(s) 1030 of FIG. 10). The LB subnet(s) 1122 contained in the control plane DMZ tier 1120 can be communicatively coupled to the app subnet(s) 1126 contained in the control plane app tier 1124 and an Internet gateway 1134 (e.g., the Internet gateway 1034 of FIG. 10) that can be contained in the control plane VCN 1116, and the app subnet(s) 1126 can be communicatively coupled to the DB subnet(s) 1130 contained in the control plane data tier 1128 and a service gateway 1136 (e.g., the service gateway 1036 of FIG. 10) and a network address translation (NAT) gateway 1138 (e.g., the NAT gateway 1038 of FIG. 10). The control plane VCN 1116 can include the service gateway 1136 and the NAT gateway 1138.

The control plane VCN 1116 can include a data plane mirror app tier 1140 (e.g., the data plane mirror app tier 1040 of FIG. 10) that can include app subnet(s) 1126. The app subnet(s) 1126 contained in the data plane mirror app tier 1140 can include a virtual network interface controller (VNIC) 1142 (e.g., the VNIC of 1042) that can execute a compute instance 1144 (e.g., similar to the compute instance 1044 of FIG. 10). The compute instance 1144 can facilitate communication between the app subnet(s) 1126 of the data plane mirror app tier 1140 and the app subnet(s) 1126 that can be contained in a data plane app tier 1146 (e.g., the data plane app tier 1046 of FIG. 10) via the VNIC 1142 contained in the data plane mirror app tier 1140 and the VNIC 1142 contained in the data plane app tier 1146.

The Internet gateway 1134 contained in the control plane VCN 1116 can be communicatively coupled to a metadata management service 1152 (e.g., the metadata management service 1052 of FIG. 10) that can be communicatively coupled to public Internet 1154 (e.g., public Internet 1054 of FIG. 10). Public Internet 1154 can be communicatively coupled to the NAT gateway 1138 contained in the control plane VCN 1116. The service gateway 1136 contained in the control plane VCN 1116 can be communicatively coupled to cloud services 1156 (e.g., cloud services 1056 of FIG. 10).

In some examples, the data plane VCN 1118 can be contained in the customer tenancy 1121. In this case, the IaaS provider may provide the control plane VCN 1116 for each customer, and the IaaS provider may, for each customer, set up a unique compute instance 1144 that is contained in the service tenancy 1119. Each compute instance 1144 may allow communication between the control plane VCN 1116, contained in the service tenancy 1119, and the data plane VCN 1118 that is contained in the customer tenancy 1121. The compute instance 1144 may allow resources, that are provisioned in the control plane VCN 1116 that is contained in the service tenancy 1119, to be deployed or otherwise used in the data plane VCN 1118 that is contained in the customer tenancy 1121.

In other examples, the customer of the IaaS provider may have databases that live in the customer tenancy 1121. In this example, the control plane VCN 1116 can include the data plane mirror app tier 1140 that can include app subnet(s) 1126. The data plane mirror app tier 1140 can reside in the data plane VCN 1118, but the data plane mirror app tier 1140 may not live in the data plane VCN 1118. That is, the data plane mirror app tier 1140 may have access to the customer tenancy 1121, but the data plane mirror app tier 1140 may not exist in the data plane VCN 1118 or be owned or operated by the customer of the IaaS provider. The data plane mirror app tier 1140 may be configured to make calls to the data plane VCN 1118 but may not be configured to make calls to any entity contained in the control plane VCN 1116. The customer may desire to deploy or otherwise use resources in the data plane VCN 1118 that are provisioned in the control plane VCN 1116, and the data plane mirror app tier 1140 can facilitate the desired deployment, or other usage of resources, of the customer.

In some embodiments, the customer of the IaaS provider can apply filters to the data plane VCN 1118. In this embodiment, the customer can determine what the data plane VCN 1118 can access, and the customer may restrict access to public Internet 1154 from the data plane VCN

1118. The IaaS provider may not be able to apply filters or otherwise control access of the data plane VCN 1118 to any outside networks or databases. Applying filters and controls by the customer onto the data plane VCN 1118, contained in the customer tenancy 1121, can help isolate the data plane VCN 1118 from other customers and from public Internet 1154.

In some embodiments, cloud services 1156 can be called by the service gateway 1136 to access services that may not exist on public Internet 1154, on the control plane VCN 1116, or on the data plane VCN 1118. The connection between cloud services 1156 and the control plane VCN 1116 or the data plane VCN 1118 may not be live or continuous. Cloud services 1156 may exist on a different network owned or operated by the IaaS provider. Cloud services 1156 may be configured to receive calls from the service gateway 1136 and may be configured to not receive calls from public Internet 1154. Some cloud services 1156 may be isolated from other cloud services 1156, and the control plane VCN 1116 may be isolated from cloud services 1156 that may not be in the same region as the control plane VCN 1116. For example, the control plane VCN 1116 may be located in "Region 1," and cloud service "Deployment 10," may be located in Region 1 and in "Region 2." If a call to Deployment 10 is made by the service gateway 1136 contained in the control plane VCN 1116 located in Region 1, the call may be transmitted to Deployment 10 in Region 1. In this example, the control plane VCN 1116, or Deployment 10 in Region 1, may not be communicatively coupled to, or otherwise in communication with, Deployment 10 in Region 2.

Figure 12:
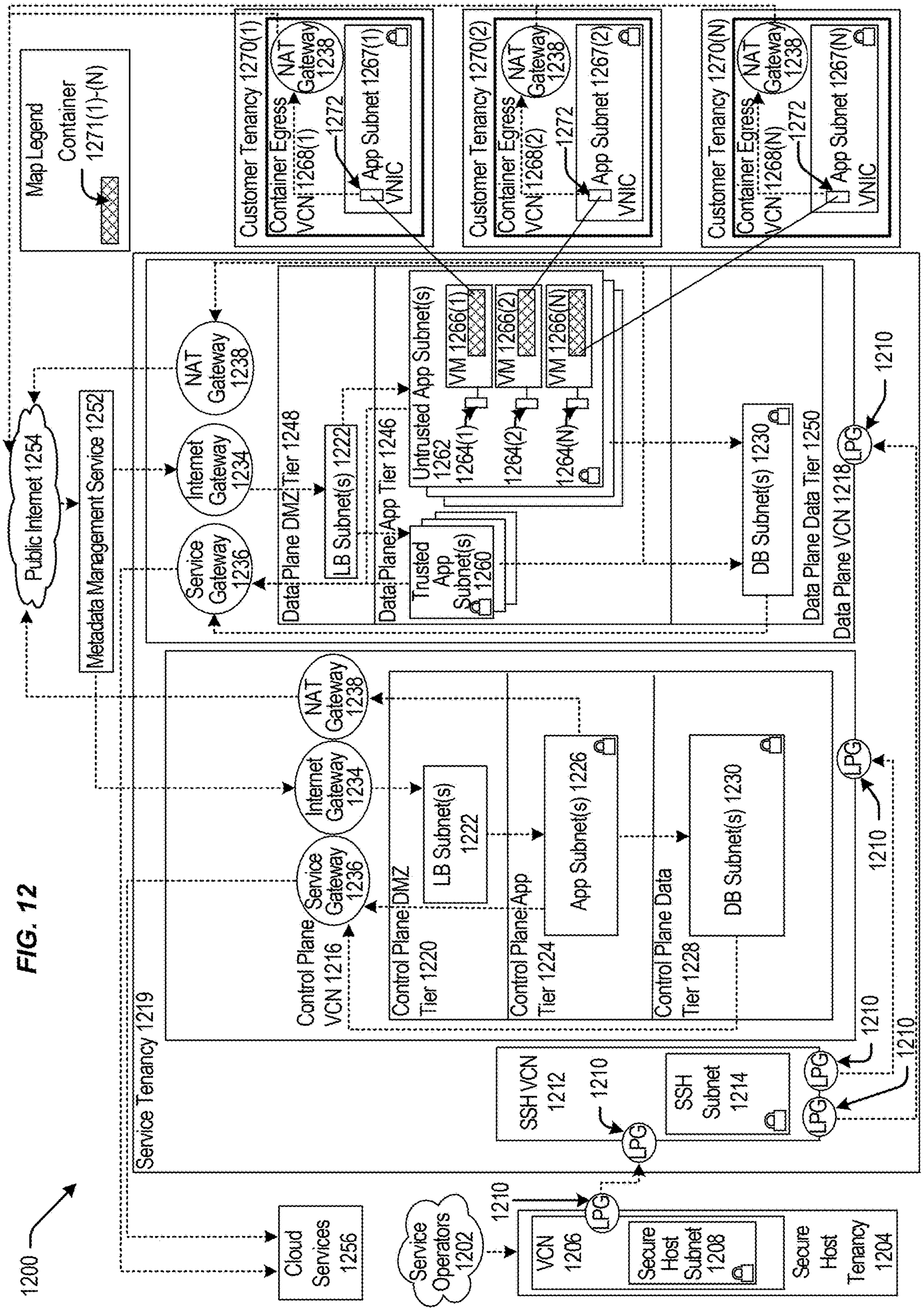
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 1002 of FIG. 10) can be communicatively coupled to a secure host tenancy 1204 (e.g., the secure host tenancy 1004 of FIG. 10) that can include a virtual cloud network (VCN) 1206 (e.g., the VCN 1006 of FIG. 10) and a secure host subnet 1208 (e.g., the secure host subnet 1008 of FIG. 10). The VCN 1206 can include an LPG 1210 (e.g., the LPG 1010 of FIG. 10) that can be communicatively coupled to an SSH VCN 1212 (e.g., the SSH VCN 1012 of FIG. 10) via an LPG 1210 contained in the SSH VCN 1212. The SSH VCN 1212 can include an SSH subnet 1214 (e.g., the SSH subnet 1014 of FIG. 10), and the SSH VCN 1212 can be communicatively coupled to a control plane VCN 1216 (e.g., the control plane VCN 1016 of FIG. 10) via an LPG 1210 contained in the control plane VCN 1216 and to a data plane VCN 1218 (e.g., the data plane 1018 of FIG. 10) via an LPG 1210 contained in the data plane VCN 1218. The control plane VCN 1216 and the data plane VCN 1218 can be contained in a service tenancy 1219 (e.g., the service tenancy 1019 of FIG. 10).

The control plane VCN 1216 can include a control plane DMZ tier 1220 (e.g., the control plane DMZ tier 1020 of FIG. 10) that can include load balancer (LB) subnet(s) 1222 (e.g., LB subnet(s) 1022 of FIG. 10), a control plane app tier 1224 (e.g., the control plane app tier 1024 of FIG. 10) that can include app subnet(s) 1226 (e.g., similar to app subnet(s) 1026 of FIG. 10), a control plane data tier 1228 (e.g., the control plane data tier 1028 of FIG. 10) that can include DB subnet(s) 1230. The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 1034 of FIG. 10) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 10) and a network address translation (NAT) gateway 1238 (e.g., the NAT gateway 1038 of FIG. 10). The control plane VCN 1216 can include the service gateway 1236 and the NAT gateway 1238.

The data plane VCN 1218 can include a data plane app tier 1246 (e.g., the data plane app tier 1046 of FIG. 10), a data plane DMZ tier 1248 (e.g., the data plane DMZ tier 1048 of FIG. 10), and a data plane data tier 1250 (e.g., the data plane data tier 1050 of FIG. 10). The data plane DMZ tier 1248 can include LB subnet(s) 1222 that can be communicatively coupled to trusted app subnet(s) 1260 and untrusted app subnet(s) 1262 of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include one or more primary VNICs 1264(1)-(N) that can be communicatively coupled to tenant virtual machines (VMs) 1266(1)-(N). Each tenant VM 1266(1)-(N) can be communicatively coupled to a respective app subnet 1267(1)-(N) that can be contained in respective container egress VCNs 1268(1)-(N) that can be contained in respective customer tenancies 1270(1)-(N). Respective secondary VNICs 1272(1)-(N) can facilitate communication between the untrusted app subnet(s) 1262 contained in the data plane VCN 1218 and the app subnet contained in the container egress VCNs 1268(1)-(N). Each container egress VCNs 1268(1)-(N) can include a NAT gateway 1238 that can be communicatively coupled to public Internet 1254 (e.g., public Internet 1054 of FIG. 10).

The Internet gateway 1234 contained in the control plane VCN 1216 and contained in the data plane VCN 1218 can be communicatively coupled to a metadata management service 1252 (e.g., the metadata management system 1052 of FIG. 10) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively coupled to cloud services 1256.

In some embodiments, the data plane VCN 1218 can be integrated with customer tenancies 1270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1246. Code to run the function may be executed in the VMs 1266(1)-(N), and the code may not be configured to run anywhere else on the data plane VCN 1218. Each VM

1266(1)-(N) may be connected to one customer tenancy 1270. Respective containers 1271(1)-(N) contained in the VMs 1266(1)-(N) may be configured to run the code. In this case, there can be a dual isolation (e.g., the containers 1271(1)-(N) running code, where the containers 1271(1)-(N) may be contained in at least the VM 1266(1)-(N) that are contained in the untrusted app subnet(s) 1262), which may help prevent incorrect or otherwise undesirable code from damaging the network of the IaaS provider or from damaging a network of a different customer. The containers 1271 (1)-(N) may be communicatively coupled to the customer tenancy 1270 and may be configured to transmit or receive data from the customer tenancy 1270. The containers 1271 (1)-(N) may not be configured to transmit or receive data from any other entity in the data plane VCN 1218. Upon completion of running the code, the IaaS provider may kill or otherwise dispose of the containers 1271(1)-(N).

In some embodiments, the trusted app subnet(s) 1260 may run code that may be owned or operated by the IaaS provider. In this embodiment, the trusted app subnet(s) 1260 may be communicatively coupled to the DB subnet(s) 1230 and be configured to execute CRUD operations in the DB subnet(s) 1230. The untrusted app subnet(s) 1262 may be communicatively coupled to the DB subnet(s) 1230, but in this embodiment, the untrusted app subnet(s) may be configured to execute read operations in the DB subnet(s) 1230. The containers 1271(1)-(N) that can be contained in the VM 1266(1)-(N) of each customer and that may run code from the customer may not be communicatively coupled with the DB subnet(s) 1230.

In other embodiments, the control plane VCN 1216 and the data plane VCN 1218 may not be directly communicatively coupled. In this embodiment, there may be no direct communication between the control plane VCN 1216 and the data plane VCN 1218. However, communication can occur indirectly through at least one method. An LPG 1210 may be established by the IaaS provider that can facilitate communication between the control plane VCN 1216 and the data plane VCN 1218. In another example, the control plane VCN 1216 or the data plane VCN 1218 can make a call to cloud services 1256 via the service gateway 1236. For example, a call to cloud services 1256 from the control plane VCN 1216 can include a request for a service that can communicate with the data plane VCN 1218.

Figure 13:
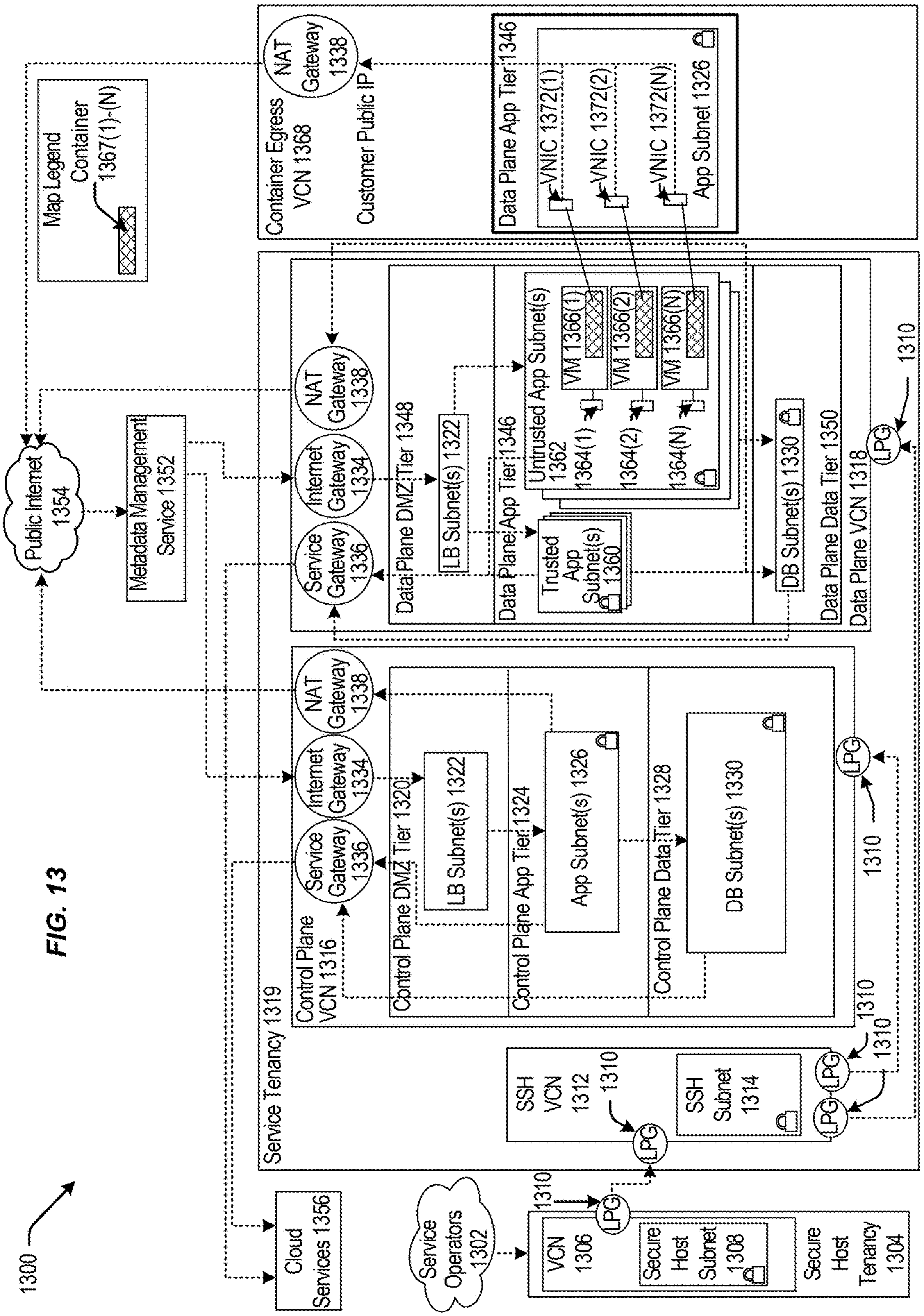
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1002 of FIG. 10) can be communicatively coupled to a secure host tenancy 1304 (e.g., the secure host tenancy 1004 of FIG. 10) that can include a virtual cloud network (VCN) 1306 (e.g., the VCN 1006 of FIG. 10) and a secure host subnet 1308 (e.g., the secure host subnet 1008 of FIG. 10). The VCN 1306 can include an LPG 1310 (e.g., the LPG 1010 of FIG. 10) that can be communicatively coupled to an SSH VCN 1312 (e.g., the SSH VCN 1012 of FIG. 10) via an LPG 1310 contained in the SSH VCN 1312. The SSH VCN 1312 can include an SSH subnet 1314 (e.g., the SSH subnet 1014 of FIG. 10), and the SSH VCN 1312 can be communicatively coupled to a control plane VCN 1316 (e.g., the control plane VCN 1016 of FIG. 10) via an LPG 1310 contained in the control plane VCN 1316 and to a data plane VCN 1318 (e.g., the data plane 1018 of FIG. 10) via an LPG 1310 contained in the data plane VCN 1318. The control plane VCN 1316 and the data plane VCN 1318 can be contained in a service tenancy 1319 (e.g., the service tenancy 1019 of FIG. 10).

The control plane VCN 1316 can include a control plane DMZ tier 1320 (e.g., the control plane DMZ tier 1020 of FIG. 10) that can include LB subnet(s) 1322 (e.g., LB subnet(s) 1022 of FIG. 10), a control plane app tier 1324 (e.g., the control plane app tier 1024 of FIG. 10) that can include app subnet(s) 1326 (e.g., app subnet(s) 1026 of FIG. 10), a control plane data tier 1328 (e.g., the control plane data tier 1028 of FIG. 10) that can include DB subnet(s) 1330 (e.g., DB subnet(s) 1230 of FIG. 12). The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1034 of FIG. 10) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 10) and a network address translation (NAT) gateway 1338 (e.g., the NAT gateway 1038 of FIG. 10). The control plane VCN 1316 can include the service gateway 1336 and the NAT gateway 1338.

The data plane VCN 1318 can include a data plane app tier 1346 (e.g., the data plane app tier 1046 of FIG. 10), a data plane DMZ tier 1348 (e.g., the data plane DMZ tier 1048 of FIG. 10), and a data plane data tier 1350 (e.g., the data plane data tier 1050 of FIG. 10). The data plane DMZ tier 1348 can include LB subnet(s) 1322 that can be communicatively coupled to trusted app subnet(s) 1360 (e.g., trusted app subnet(s) 1260 of FIG. 12) and untrusted app subnet(s) 1362 (e.g., untrusted app subnet(s) 1262 of FIG. 12) of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include primary VNICs 1364(1)-(N) that can be communicatively coupled to tenant virtual machines (VMs) 1366(1)-(N) residing within the untrusted app subnet(s) 1362. Each tenant VM 1366(1)-(N) can run code in a respective container 1367(1)-(N) and be communicatively coupled to an app subnet 1326 that can be contained in a data plane app tier 1346 that can be contained in a container egress VCN 1368. Respective secondary VNICs 1372(1)-(N) can facilitate communication between the untrusted app subnet(s) 1362 contained in the data plane VCN 1318 and the app subnet contained in the container egress VCN 1368. The container egress VCN can include a NAT gateway 1338 that can be communicatively coupled to public Internet 1354 (e.g., public Internet 1054 of FIG. 10).

The Internet gateway 1334 contained in the control plane VCN 1316 and contained in the data plane VCN 1318 can be communicatively coupled to a metadata management service 1352 (e.g., the metadata management system 1052 of FIG. 10) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively coupled to cloud services 1356.

In some examples, the pattern illustrated by the architecture of block diagram 1300 of FIG. 13 may be considered an exception to the pattern illustrated by the architecture of block diagram 1200 of FIG. 12 and may be desirable for a customer of the IaaS provider if the IaaS provider cannot directly communicate with the customer (e.g., a disconnected region). The respective containers 1367(1)-(N) that are contained in the VMs 1366(1)-(N) for each customer can be accessed in real-time by the customer. The containers 1367(1)-(N) may be configured to make calls to respective secondary VNICs 1372(1)-(N) contained in app subnet(s) 1326 of the data plane app tier 1346 that can be contained in the container egress VCN 1368. The secondary VNICs 1372(1)-(N) can transmit the calls to the NAT gateway 1338 that may transmit the calls to public Internet 1354. In this example, the containers 1367(1)-(N) that can be accessed in real-time by the customer can be isolated from the control plane VCN 1316 and can be isolated from other entities contained in the data plane VCN 1318. The containers 1367(1)-(N) may also be isolated from resources from other customers.

In other examples, the customer can use the containers 1367(1)-(N) to call cloud services 1356. In this example, the customer may run code in the containers 1367(1)-(N) that requests a service from cloud services 1356. The containers 1367(1)-(N) can transmit this request to the secondary VNICs 1372(1)-(N) that can transmit the request to the NAT gateway that can transmit the request to public Internet 1354. Public Internet 1354 can transmit the request to LB subnet(s) 1322 contained in the control plane VCN 1316 via the Internet gateway 1334. In response to determining the request is valid, the LB subnet(s) can transmit the request to app subnet(s) 1326 that can transmit the request to cloud services 1356 via the service gateway 1336.

It should be appreciated that IaaS architectures 1000, 1100, 1200, 1300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 14:
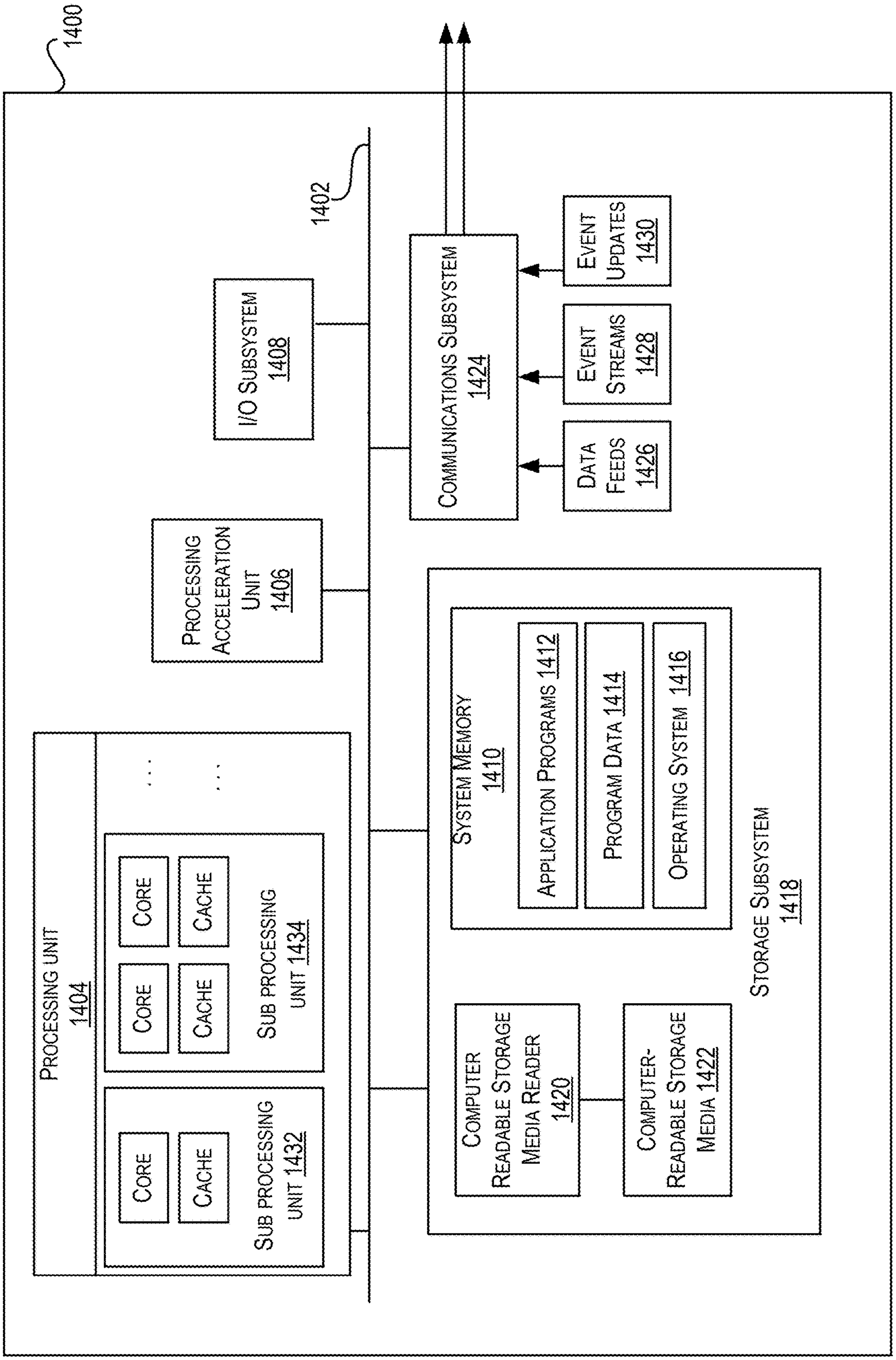
FIG. 14 is a block diagram illustrating an example computer system, according to at least one embodiment.

FIG. 14 illustrates an example computer system 1400, in which various embodiments may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1404 provide the functionality described above. Storage subsystem 1418 may also provide a repository for storing data used in accordance with the present disclosure.

As depicted in the example in FIG. 14, storage subsystem 1418 can include various components including a system memory 1410, computer-readable storage media 1422, and a computer readable storage media reader 1420. System memory 1410 may store program instructions that are loadable and executable by processing unit 1404. System memory 1410 may also store data that is used during the execution of the instructions and/or data that is generated during the execution of the program instructions. Various different kinds of programs may be loaded into system memory 1410 including but not limited to client applications, Web browsers, mid-tier applications, relational database management systems (RDBMS), virtual machines, containers, etc.

System memory 1410 may also store an operating system 1416. Examples of operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1400 executes one or more virtual machines, the virtual machines along with their guest operating systems (GOSs) may be loaded into system memory 1410 and executed by one or more processors or cores of processing unit 1404.

System memory 1410 can come in different configurations depending upon the type of computer system 1400. For example, system memory 1410 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1410 may include a basic input/output system (BIOS) containing basic routines that help to transfer information between elements within computer system 1400, such as during start-up.

Computer-readable storage media 1422 may represent remote, local, fixed, and/or removable storage devices plus storage media for temporarily and/or more permanently containing, storing, computer-readable information for use by computer system 1400 including instructions executable by processing unit 1404 of computer system 1400.

Computer-readable storage media 1422 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1422 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Machine-readable instructions executable by one or more processors or cores of processing unit 1404 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

executing, by a cluster of computing nodes of a cloud computing environment, an object-relational database management system comprising a primary node and one or more replica nodes each concurrently sharing read access to a single block storage volume comprising a staging area and a main area, the staging area and the main area collectively storing data corresponding to a single instance of an object-relational database to which access is concurrently shared by the primary node and the one or more replica nodes;

receiving, by the primary node of the cluster of computing nodes, a write operation comprising data to be written to the single instance of the object-relational database;

writing, by the primary node of the cluster, the data to the staging area within the single block storage volume;

maintaining, by the primary node of the cluster, a location of the data within the staging area within an in-memory map stored at the primary node of the cluster; and writing, by the primary node of the cluster, metadata corresponding to the write operation within a journal specific to the single block storage volume, wherein writing the metadata within the journal causes the metadata to be transmitted to one or more replica nodes.

2. The computer-implemented method of claim 1, wherein the primary node is configured as a sole writer for the single block storage volume, and wherein the one or more replica nodes have read-only access to the single block storage volume.

3. The computer-implemented method of claim 1, further comprising:

receiving, at a read-replica node of the cluster of computing nodes, a read operation requesting second data to be read from the object-relational database;

determining, by the read-replica node, whether the second data is stored in the staging area;

in response to determining that the second data is stored in the staging area, retrieving the second data from the staging area of the single block storage volume; and in response to determining that the second data is not stored in the staging area, retrieving the second data from the main area of the single block storage volume.

4. The computer-implemented method of claim 1, wherein the one or more replica nodes are configured to provide respective log sequence numbers to the single block storage volume, each respective log sequence number indicating a last log sequence number that has been replayed by a respective replica node, wherein the single block storage volume stores a minimum log sequence number selected from the respective log sequence numbers provided by the one or more replica nodes.

5. The computer-implemented method of claim 4, wherein previously-stored data is subsequently evicted from the staging area based at least in part on the minimum log sequence number.

6. The computer-implemented method of claim 5, wherein the previously-stored data is evicted based at least in part on determining that the data is associated with one or more corresponding log sequence numbers that are less than the minimum log sequence number, wherein evicting the data comprising moving the data from the staging area to the main area of the single block storage volume.

7. The computer-implemented method of claim 6, further comprising:

receiving, by the primary node, a subsequent write operation comprising third data and an additional log sequence number, the additional log sequence number being less than the minimum log sequence number; and writing, by the primary node, the third data corresponding to the subsequent write operation to the main area of the single block storage volume.

8. The computer-implemented method of claim 7, further comprising registering, by the primary node, as a writer of the cluster with a block storage service, wherein the block storage service is configured to accept a write request from a single primary node and reject write requests from nodes other than the single primary node.

9. A computing device, comprising:

one or more processors; and one or more memories that store computer-executable instructions that, when executed by the one or more processors, cause the one or more processors to:

execute, as one of a cluster of computing nodes of a cloud computing environment, an object-relational database management system comprising a primary node and one or more replica nodes, the cluster of computing nodes, each concurrently sharing access to a single block storage volume comprising a staging area and a main area that collectively store a single instance of an object-relational database to which access is concurrently shared by the primary node and the one or more replica nodes;

receive a write operation comprising data to be written to the single instance of the object-relational database;

write the data to the single block storage volume, wherein the data is written to the staging area when a log sequence number associated with the data is greater than a minimum log sequence number associated with the staging area, and wherein the data is written to the main area when the log sequence number associated with the data is less than or equal to the minimum log sequence number associated with the staging area; and maintain a location of the data within the single block storage volume within an in-memory map stored at the primary node.

10. The computing device of claim 9, wherein executing the computer-executable instructions further causes the one or more processors to write metadata corresponding to the write operation within a journal specific to the single block storage volume, wherein writing the metadata within the journal causes the one or more replica nodes to materialize a page using the single instance of the object-relational database.

11. The computing device of claim 9, wherein the staging area and the main area are automatically resized by a file system process based at least in part on usage.

12. The computing device of claim 9, wherein a replica node of the one or more replica nodes is configured to determine that the primary node is unhealthy and, in response, register with a block storage control plane, as a new primary node of the cluster.

13. The computing device of claim 12, wherein the replica node is selected by a management plane component of the object-relational database management system.

14. A computer-readable medium comprising one or more memories storing computer-executable instructions that, when executed by one or more processors of a cloud computing environment, cause the one or more processors to:

execute at least a portion of an object-relational database management system comprising a cluster of computing nodes, the cluster of computing nodes comprising a primary node and one or more replica nodes, the cluster of computing nodes each concurrently sharing read access to a single block storage volume comprising a staging area and a main area, the staging area and the main area of the single block storage volume collectively storing a single instance of an object-relational database to which access is concurrently shared by the primary node and the one or more replica nodes;

receive a read request for data of the single instance of the object-relational database that is stored within the single block storage volume;

obtain the data from the single instance of the object-relational database stored in the single block storage volume, the data being obtained from the staging area or the main area based at least in part on a minimum log sequence number associated with the single block storage volume;

store the data within local memory;

update the data in the local memory based at least in part on one or more journal entries corresponding to the data, the one or more journal entries indicating respective modifications to the object-relational database; and respond to the read request based at least in part on the data updated in local memory.

15. The computer-readable medium of claim 14, wherein the minimum log sequence number is an earliest log sequence number that has been replayed by the one or more replica nodes.

16. The computer-readable medium of claim 14, wherein the single block storage volume, the staging area, and the main area are automatically scalable.

17. The computer-readable medium of claim 14, wherein executing the computer-executable instructions further causes the one or more processors to maintain an identifier of a location of the data within the single block storage volume.

18. The computer-readable medium of claim 14, wherein the one or more replica nodes are configured to read journal entries provided by the primary node, and wherein reading the journal entries causes the one or more replica nodes to update in-memory data.

19. The computer-readable medium of claim 14, wherein the single block storage volume utilizes a distributed file-system that enables multiple nodes to concurrently access the single block storage volume and supports a single-writer-multiple-reader access model.

20. The computer-readable medium of claim 14, wherein the data is obtained from a first portion of the single instance of the object-relational database within the staging area when a page identifier associated with the data is associated with a log sequence number that is greater than the minimum log sequence number, and wherein the data is obtained from a second portion of the single instance of the object-relational database within the main area when the log sequence number that is less than or equal to the minimum log sequence number.

21. The computer-readable medium of claim 14, wherein the object-relational database management system is a PostgreSQL object-relational database management system.

* * * * *